US008676889B2

(12) United States Patent
Ono et al.

(10) Patent No.: US 8,676,889 B2
(45) Date of Patent: Mar. 18, 2014

(54) CONNECTION DEVICE, CONNECTION METHOD FOR THE SAME, AND PROGRAM

(75) Inventors: Ryutaro Ono, Tokyo (JP); Naoyuki Mochida, Tokyo (JP)

(73) Assignee: Panasonic Corporation, Osaka (JP)

( * ) Notice: Subject to any disclaimer, the term of this patent is extended or adjusted under 35 U.S.C. 154(b) by 329 days.

(21) Appl. No.: 12/808,810

(22) PCT Filed: Dec. 18, 2008

(86) PCT No.: PCT/JP2008/003827
§ 371 (c)(1),
(2), (4) Date: Jun. 17, 2010

(87) PCT Pub. No.: WO2009/081550
PCT Pub. Date: Jul. 2, 2009

(65) Prior Publication Data
US 2010/0262669 A1    Oct. 14, 2010

(30) Foreign Application Priority Data
Dec. 20, 2007    (JP) ................................. 2007-329386

(51) Int. Cl.
*G06F 15/16*    (2006.01)
(52) U.S. Cl.
USPC ............................ 709/204; 709/203; 709/217
(58) Field of Classification Search
USPC .................. 709/203, 204, 217, 231
See application file for complete search history.

(56) References Cited

U.S. PATENT DOCUMENTS

| | | | |
|---|---|---|---|
| 7,636,750 B2 * | 12/2009 | Haldar ......................... | 709/204 |
| 2004/0229596 A1 | 11/2004 | Stura et al. | |
| 2006/0164507 A1 * | 7/2006 | Eshkoli et al. ............. | 348/14.09 |
| 2006/0206560 A1 | 9/2006 | Kanada | |

(Continued)

FOREIGN PATENT DOCUMENTS

| | | |
|---|---|---|
| CN | 1816134 A | 8/2006 |
| CN | 101039409 A | 9/2007 |

(Continued)

OTHER PUBLICATIONS

Full machine translation and partial English translation (Fig. 12) of JP 2007-041851, published Feb. 15, 2007.

(Continued)

*Primary Examiner* — Phuoc Nguyen
(74) *Attorney, Agent, or Firm* — Wenderoth, Lind & Ponack, L.L.P.

(57) ABSTRACT

A connection device according to an aspect of the present invention is a server (104) which establishes a connection among a terminal (101), a terminal (102), and a terminal (103) for a multipoint conference in which media data is directly transmitted and received among the terminals (101 to 103), the connection device includes a caller information obtaining unit (202) and a callee information obtaining unit (203) which obtains media information of the terminals, a holding unit (204) which transmits, to the terminal (101), a first message for preventing the terminal (101) from starting a transmission of the media data to the terminal (102) and the terminal (103), when the media information of the terminal (102) and the terminal (103) is not obtained, and a communication starting unit (205) which transmits a second message (i) including the media information of the terminal (102) and (ii) for causing the terminal (101) to start transmitting the media data to the terminal (102), when the media information of the terminal (102) is obtained after the first message is transmitted.

16 Claims, 33 Drawing Sheets

(56) References Cited

U.S. PATENT DOCUMENTS

2007/0273755 A1    11/2007  Yang et al.
2008/0218586 A1*   9/2008   Graham et al. ............ 348/14.09
2009/0174764 A1*   7/2009   Chadha et al. ............ 348/14.09

FOREIGN PATENT DOCUMENTS

| | | |
|---|---|---|
| JP | 2004-15359 | 1/2004 |
| JP | 2004-336160 | 11/2004 |
| JP | 2005-184754 | 7/2005 |
| JP | 2005-311670 | 11/2005 |
| JP | 2005-333446 | 12/2005 |
| JP | 2006-254166 | 9/2006 |
| JP | 2007-500981 | 1/2007 |
| JP | 2007-41851 | 2/2007 |
| JP | 2007-251567 | 9/2007 |
| WO | 03/036927 | 5/2003 |

OTHER PUBLICATIONS

International Search Report issued Feb. 24, 2009 in corresponding International Application No. PCT/JP2008/003827.

\* cited by examiner

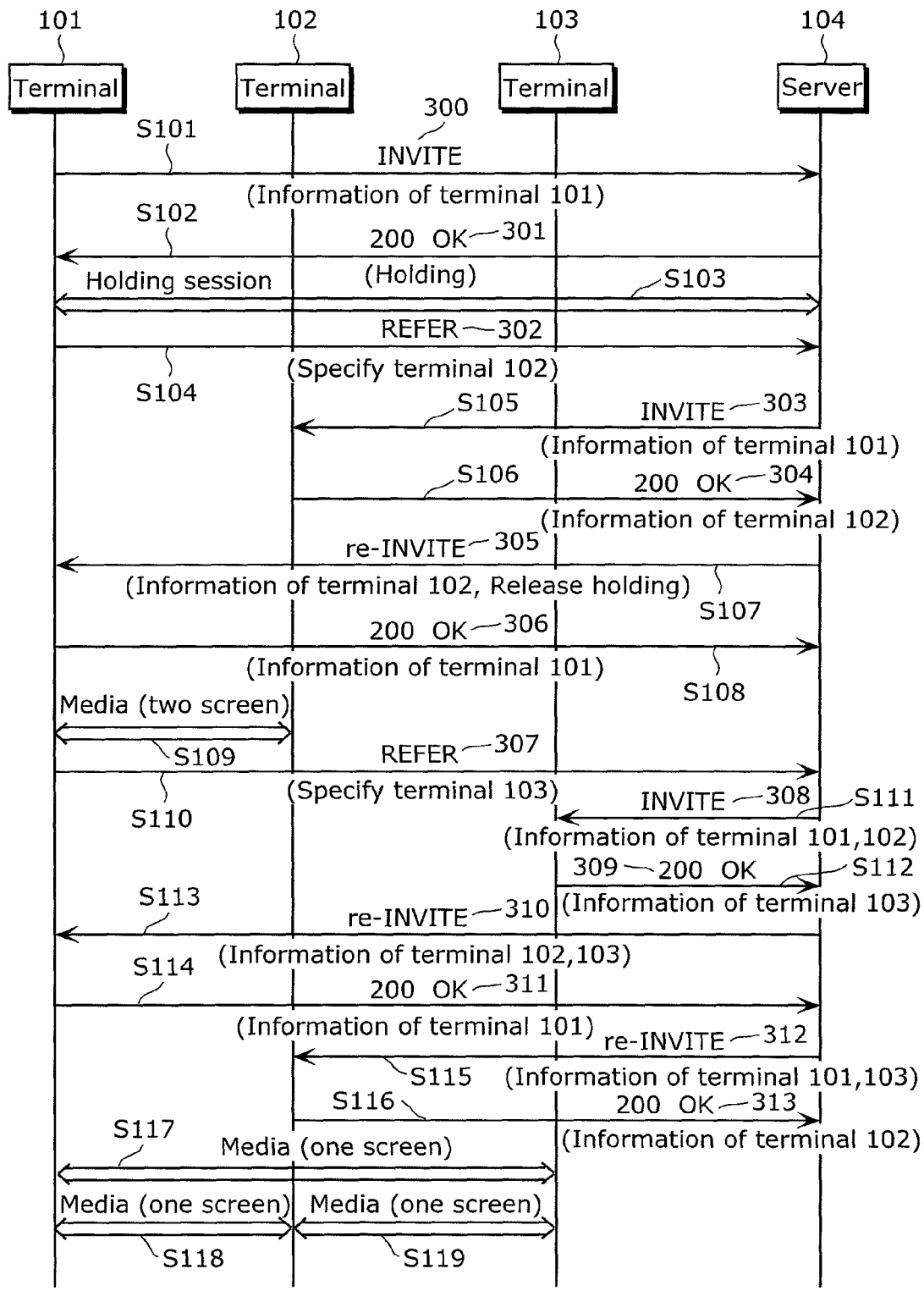

FIG. 4

```
                    ┌─────────────────────────────┐
                    │           INVITE            │
                    │  c=IN IP4 192. 168. 1.  1   │──── 401
                    │  m=audio 5000 RTP/AVP 0     │──── 402
                    │  a=rtpmap:0 PCMU/8000       │──── 403
                    │  m=audio 5002 RTP/AVP 0     │
                    │  a=rtpmap:0 PCMU/8000       │
                    │  m=video 5010 RTP/AVP 0     │
                    │  a=rtpmap:98 MP4V-ES/90000  │
                    │  m=video 5012 RTP/AVP 0     │
                    │  a=rtpmap:98 MP4V-ES/90000  │
                    └─────────────────────────────┘
                                    300
```

FIG. 5

```
                    ┌─────────────────────────────┐
                    │           200 OK            │
                    │  c=IN IP4 192. 168. 1.  4   │──── 401
                    │  m=audio 10000 RTP/AVP 0    │──── 402
                    │  a=rtpmap:0 PCMU/8000       │──── 403
                    │  a=inactive                 │──── 404
                    │  m=audio 10002 RTP/AVP 0    │
                    │  a=rtpmap:0 PCMU/8000       │
                    │  a=inactive                 │
                    │  m=video 10010 RTP/AVP 0    │
                    │  a=rtpmap:98 MP4V-ES/90000  │
                    │  a=inactive                 │
                    │  m=video 10012 RTP/AVP 0    │
                    │  a=rtpmap:98 MP4V-ES/90000  │
                    │  a=inactive                 │
                    └─────────────────────────────┘
                                    301
```

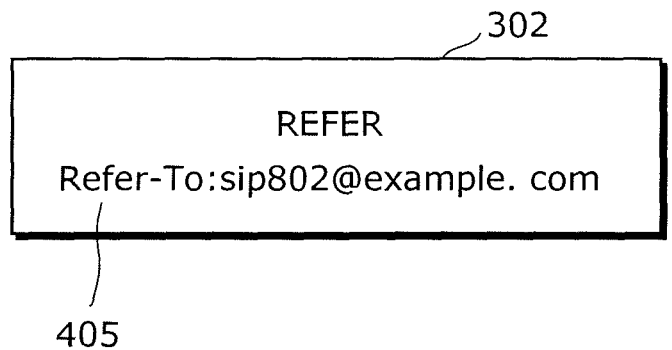
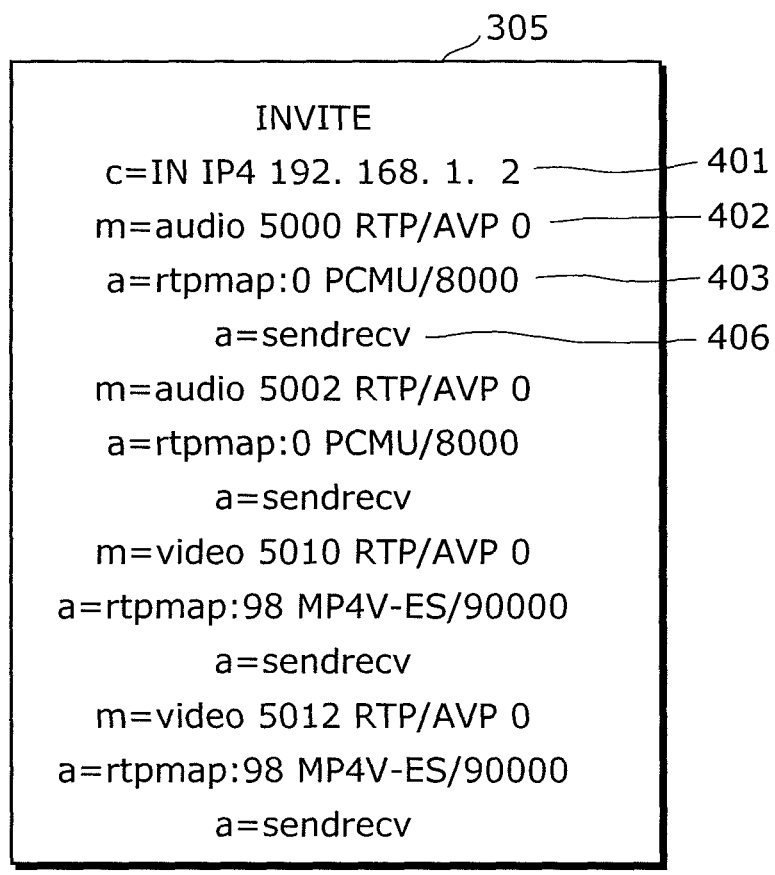

FIG. 8
306

```
200 OK
c=IN IP4 192. 168. 1. 1          — 401
m=audio 5000 RTP/AVP 0          — 402
a=rtpmap:0 PCMU/8000            — 403
a=sendrecv                      — 406
m=audio 5002 RTP/AVP 0
a=rtpmap:0 PCMU/8000
a=sendrecv
m=video 5010 RTP/AVP 0
a=rtpmap:98 MP4V-ES/90000
a=sendrecv
m=video 5012 RTP/AVP 0
a=rtpmap:98 MP4V-ES/90000
a=sendrecv
```

FIG. 9
308

```
INVITE
c=IN IP4 192. 168. 1. 1          — 401
m=audio 5000 RTP/AVP 0          — 402
a=rtpmap:0 PCMU/8000            — 403
m=video 5010 RTP/AVP 0
a=rtpmap:98 MP4V-ES/90000
c=IN IP4 192. 168. 1. 2
m=audio 5002 RTP/AVP 0
a=rtpmap:0 PCMU/8000
m=video 5012 RTP/AVP 0
a=rtpmap:98 MP4V-ES/90000
```

FIG. 12

```
                           ┌─ 301
200 OK
 c=IN IP4 192. 168. 1. 4 ──────── 401
 m=audio 10000 RTP/AVP 0 ──────── 402
  a=rtpmap:0 PCMU/8000 ──────── 403
    a=sendonly ──────── 404
 m=audio 10002 RTP/AVP 0
  a=rtpmap:0 PCMU/8000
    a=sendonly
 m=video 10010 RTP/AVP 0
a=rtpmap:98 MP4V-ES/90000
    a=sendonly
 m=video 10012 RTP/AVP 0
a=rtpmap:98 MP4V-ES/90000
    a=sendonly
```

FIG. 25

```
                    INVITE
        c=IN IP4 192. 168. 1.  2 ─────── 401
        m=audio 5000 RTP/AVP 0 ─────── 402
        a=rtpmap:0 PCMU/8000 ─────── 403
               a=sendrecv ─────── 406
        m=video 5010 RTP/AVP 0
        a=rtpmap:98 MP4V-ES/90000
               a=sendrecv
        c=IN IP4 192. 168. 1.  4
        m=audio 5002 RTP/AVP 0
        a=rtpmap:0 PCMU/8000
               a=inactive ─────── 404
        m=video 5012 RTP/AVP 0
        a=rtpmap:98 MP4V-ES/90000
               a=inactive
```

```
                    380
        INVITE
   c=IN IP4 192. 168. 1.  1 ————— 401
         a=terminal:3 ————— 407
   m=audio 5000 RTP/AVP 0 ————— 402
    a=rtpmap:0 PCMU/8000 ————— 403
   m=audio 5002 RTP/AVP 0
    a=rtpmap:0 PCMU/8000
   m=video 5010 RTP/AVP 0
  a=rtpmap:98 MP4V-ES/90000
   m=video 5012 RTP/AVP 0
  a=rtpmap:98 MP4V-ES/90000
```

CONNECTION DEVICE, CONNECTION METHOD FOR THE SAME, AND PROGRAM

TECHNICAL FIELD

The present invention relates to connection devices and connection methods for the same, and particularly relates to a connection device which establishes a connection among terminals for a multipoint conference in which the terminals directly transmit and receive media data to and from the terminals.

BACKGROUND ART

In recent years, conference communication services that implements multipoint conferences in which three or more parties can join have been in practical use. Audio conferences and multipoint video conferences are examples of the multipoint conferences.

A conference function compliant to the Session Initiation Protocol (SIP) may be used to provide this service. The conference call system for organizing a conference call using the SIP conference function includes multiple terminals, a conference server for controlling the connection among the terminals, and a mixer for synthesizing audio media data. The mixer synthesizes the audio media data transmitted from the terminals, and transmits the synthesized data to each of the terminals.

The following describes a conventional conference call system.

FIG. 32 illustrates the structure of the conventional conference call system using the SIP conference function. The conference call system 700 illustrated in FIG. 32 includes terminals 701 to 703, a server 704, a mixer 705, and a network 706.

The terminals 701 to 703 are IP telephone terminals, and the server 704 is a conference server. The network 706 is, for example, an internal network.

The terminals 701 to 703, the server 704, and the mixer 705 are connected through the network 706.

The terminals 701 to 703 transmit the audio media data to the mixer 705 through the internal network 706. The mixer 705 synthesizes the audio media data transmitted from the terminals 701 to 703. The mixer 705 transmits the synthesized audio media data to the terminals 701 to 703.

More specifically, the mixer 705 synthesizes the audio media data transmitted from the terminals 702 and 703, and transmits the synthesized audio media data to the terminal 701. Similarly, the mixer 705 synthesizes the audio media data transmitted from the terminals 701 and 703, and transmits the synthesized audio media data to the terminal 702. The mixer 705 further synthesizes the audio media data transmitted from the terminals 701 and 702, and transmits the synthesized audio media data to the terminal 703. As such, the mixer 705 in the conference call system 700 implements a three-party call.

The following describes the operations of the conventional conference call system 700.

FIG. 33 is a sequence diagram illustrating a process flow in the conventional conference call system 700. FIG. 33 also illustrates the process flow for a conference call among the terminals 701 to 703 organized by the terminal 701. In FIG. 33, ACK, REFER response, NOTIFY, NOTIFY response, MESSAGE response, and others are omitted.

First, the terminal 701, the conference organizer, transmits an INVITE message (hereafter it is also simply referred to as "INVITE". The other messages from the terminal 701 such as REFER, NOTIFY, and others are abbreviated in the same manner) describing the media information of the terminal 701 in the Session Description Protocol (SDP) to the server 704 (S701). More specifically, the media information includes the IP address, the receiving port number, and the available codec of the terminal 701.

Next, the server 704 returns a 200 response including the media information of the mixer 705 which is held in advance to the terminal 702 (S702).

Furthermore, the server 704 notifies the mixer 705 of the IP address and the receiving port number of the terminal 701, the IP address and the receiving port number of the mixer 705, and the codec to be used (S703). For example, the server 704 notifies the mixer 705 of the information of the terminal 701 and others, using MESSAGE in the SIP. Note that, the server 704 may notify the mixer 705 of the information of the terminal 701 using the HTTP and others.

The terminal 701 transmits ACK in response to the 200 response in step S702, and subsequently starts transmitting the media data to the mixer 705. The mixer 705 starts transmitting the media data to the terminal 701 (S704).

The terminal 701 then transmits REFER including SIP URI of the terminal 702 to invite the terminal 702, a terminal which is to be participating the conference (S705). The server 704 transmits a 202 response in response to REFER to the terminal 701. Furthermore, the server 704 transmits NOTIFY to the terminal 701 to notify the invited status. The terminal 701 that received NOTIFY transmits a 200 response to the server 704.

Next, the server 704 transmits INVITE including the media information of the mixer 705 to the terminal 702 (S706).

The terminal 702 that received the INVITE transmits a 200 response including the media information of the terminal 702 (S707).

The server 704 transmits ACK in response to the 200 response to the terminal 702, and subsequently notifies the mixer 705 of the necessary information using MESSAGE, in the same manner as the process for the terminal 701 (S708). The server 704 further transmits, to the terminal 701, NOTIFY for notifying that the invitation is completed. The terminal 701 transmits a 200 response in response to NOTIFY to the server 704.

The terminal 702 starts transmitting the media data to the mixer 705. The mixer 705 also starts transmitting the media data to the terminal 702 (S709).

Next, the process same as the process from step S705 to S709 is performed, and the terminal 703 and the mixer 705 start transmitting/receiving the media data to/from each other (S710 to S714).

As such, transmitting the audio media data from the terminals 701 to 703 to the mixer 705, synthesizing the audio media data by the mixer 705, and transmitting the synthesized audio media data to the terminals 701 to 703 by the mixer 705 enable an audio conference among the terminals 701 to 703.

In addition to the conference calls, the SIP conference function also implements multipoint video conferences. The following describes a conventional multipoint video conference system.

FIG. 34 illustrates a structure of the multipoint video conference system using the conventional SIP conference function. The video conference system 800 illustrated in FIG. 34 includes terminals 801 to 803, a server 804, a mixer 805, and a network 806.

The terminals 801 to 803, the server 804, and the mixer 805 are connected through the network 806.

The terminal 801 includes a camera 841, and monitors 821 and 831. The terminal 802 includes a camera 842, and monitors 822 and 832. The terminal 803 includes a camera 843, and monitors 823 and 833.

The terminals 801 to 803 transmit the video and audio media data captured by the cameras 841 to 843, respectively, to the mixer 805 via the network 806. The mixer 805 synthesizes the video and audio media data transmitted from the terminals 801 to 803. The mixer 805 also transmits the synthesized video and audio media data to the terminals 801 to 803.

More specifically, the mixer 805 transmits the media data transmitted from the terminal 802 and the media data transmitted from the terminal 803 to the terminal 801. The terminal 801 displays the received media data on the monitors 821 and 831. This allows a user 811 using the terminal 801 can talk with the user 812 using the terminal 802 and the user 813 using the terminal 803.

In the same manner, the mixer 805 transmits the media data transmitted from the terminal 801 and the media data transmitted from the terminal 803 to the terminal 802. Furthermore, the mixer 805 transmits the media data transmitted from the terminal 801 and the media data transmitted from the terminal 802 to the terminal 803. The terminal 802 displays the received media data on the monitors 822 and 832. Furthermore, the terminal 803 displays the received media data on the monitors 823 and 833.

The structure described above enables the multipoint video conference system 800 to hold a multipoint video conference.

The following describes the operations of the conventional video conference system 800.

FIG. 35 is a sequence diagram illustrating the process flow in the conventional video conference system 800. Note that FIG. 35 illustrates the process flow for a video conference among the terminals 801 to 803 organized by the terminal 801. In FIG. 35, ACK, REFER response, NOTIFY, NOTIFY response, MESSAGE response, and others are omitted.

The process in steps S801 to S814 illustrated in FIG. 35 corresponds to the process in step S701 to S714 illustrated in FIG. 33, respectively. Here, only the difference from the process illustrated in FIG. 33 shall be described.

First, the terminal 801, the conference organizer, transmits INVITE including the media information of the terminal 801 to the server 804 (S801). Here, the terminal 801 can transmit and receive two types of audio and two types of video. Thus, the INVITE includes the two receiving port numbers and available codecs corresponding to the video and audio, respectively.

Next, the server 804 returns a 200 response including the media information of the mixer 805 to the terminal 802 (S802). The 200 response includes the two receiving port numbers and available codecs corresponding to video and audio, respectively.

The server 804 further notifies the mixer 805 of the IP address and the receiving port number of the terminal 801, the IP address and the receiving port number of the mixer 705, and the codec to be used (S803). Here, the mixer 805 is notified of the receiving port numbers and available codecs corresponding to audio and video.

The messages in the following processes also include the media information with regard to the audio and video.

As such, the terminals 801 to 803 transmit the audio and video media data to the mixer 805. Furthermore, the mixer 805 synthesizes the audio and video media data and transmits the synthesized data to the terminals 801 to 803. This implements a video conference among the terminals 801 to 803

However, the conventional video conference system 800 illustrated in FIG. 34 requires the mixer 805 which synthesizes the audio and video media data. This causes a problem for the video conference system 800 that the cost for constructing the system increases. Furthermore, the media data is transmitted and received through the mixer 805. This increases the delay in the media data as much as the processing time for the mixer 805, which is another problem to be solved.

In response to these problems, there has been a video conference system that does not require the mixer 805. An example of the video conference system that does not require the mixer 805 is a video conference system using the 3rd Party Call Control (3PCC), proposed in RFC3725 by the Internet Engineering Task Force (IETF).

Furthermore, a video conference system that can hold video conferences only with terminals, without the server 804 or the mixer 805 for further cost reduction has been proposed in Patent Literature 1, for example.

The following describes a conventional video conference system using the 3PCC.

FIG. 36 illustrates the structure of the conventional video conference system using the 3PCC. The video conference system 900 illustrated in FIG. 36 includes terminals 801 to 803, a server 804, and a network 806. Note that, the reference numerals same as FIG. 34 are assigned to the components similar to the components in FIG. 34. Thus, descriptions for these components are omitted.

The video conference system 900 illustrated in FIG. 36 differs from the video conference system 800 illustrated in FIG. 34 in that the mixer 805 is not included.

FIG. 37 is a sequence diagram illustrating the process flow in the conventional video conference system 900. FIG. 37 also illustrates the process flow for a video conference among the terminals 801 to 803, triggered by the origination from the server 804.

First, the server 804 transmits INVITE that does not include the SDP to the terminal 801 (S901). The terminal 801 that received INVITE transmits a 200 response including the media information of the terminal 801 to the server 804 (S902).

The server 804 transmits INVITE including the media information of the terminal 801 included in the received 200 response to the terminal 802 (S903). Next, the terminal 802 transmits a 200 response including the media information of the terminal 802 to the server 804 (S904). The server 804 that received the 200 response returns ACK to the terminal 802 (S905).

Furthermore, the server 804 transmits ACK including the media information of the terminal 802 included in the received 200 response to the terminal 801 (S906).

As such, the terminals 801 and 802 become ready for directly transmitting/receiving the media data to/from the terminals (S907).

In addition, the terminals 802 and 803 become ready for directly transmitting/receiving the media data between the terminals, with the process similar to the process in step S901 to S907 (S908 to S914). Furthermore, the terminals 801 and 803 can directly transmit and receive the media data between the terminals with the process similar to the process in step S901 to S907 (not illustrated).

As described above, the video conference system 900 can establish a connection among the terminals 801 to 803 that allows direct transmission/reception of the media data to/from the terminals 801 to 803.

[Patent Literature 1] Japanese Unexamined Patent Application Publication 2005-333446

DISCLOSURE OF INVENTION

Problems that Invention is to Solve

However, in the conventional video conference system 900 using the 3PCC, the terminals 801 to 803 have to return a 200 response with SDP in response to INVITE without SDP transmitted from the server 804. RFC 3264 defines this function. However, the number of terminals that supports the function is limited. More specifically, the number of terminals accessible to the video conference system 900 is limited. This causes a problem in terms of convenience when constructing the video conference system 900.

In addition, in the conventional video conference system 900, the server 804 has to control the start of a video conference. For this reason, the terminals 801 to 803 never start the video conference. This is inconvenient to the users; a problem in the conventional video conference system 900.

The present invention has been conceived in view of the above problems, and it is an object of the present invention to provide a connection device which is highly convenient to the user and which enables a multipoint conference without using a mixer.

Means to Solve the Problems

In order to achieve the object, the connection device according to the present invention is a connection device which establishes a connection among a first terminal, a second terminal, and a third terminal for a multipoint conference in which media data is directly transmitted and received among the at least three terminals, the connection device including: an information obtaining unit which obtains media information related to the transmission and the reception of the media data to and from the first terminal, the second terminal, and the third terminal; a first message transmitting unit which transmits, to the first terminal, a first message for preventing the first terminal from starting a transmission of the media data to the third terminal and the second terminal, when the media information of the second terminal and the third terminal is not obtained by the information obtaining unit; and a second message transmitting unit which transmits a second message (i) including the media information of the second terminal and (ii) for causing the first terminal to start transmitting the media data to the second terminal, when the media information of the second terminal is obtained by the information obtaining unit after the first message is transmitted by the first message transmitting unit.

With this structure, the connection device according to an aspect of the present invention can cause the terminals to wait to start communicating until the media information of a callee is obtained. Accordingly, in a conference system including the connection device according to an aspect of the present invention, each of the terminals may only include a function to wait to start communicating. This increases the types of terminals that can be used for the conference system including the connection device according to an aspect of the present invention. As a result, the connection device according to an aspect of the present invention can improve the convenience for the user.

In addition, the connection device according to the present invention can cause a conference organizer terminal to wait to start communicating until the media information of the other terminals are obtained after receiving an originating message is received from the conference organizer terminal, even when the video conference starts in response to the origination from the conference organizer terminal.

With this structure, the connection device according to an aspect of the present invention can start the video conference easily, in response to the origination from the terminals. With this, the connection device according to an aspect of the present invention can improve the convenience for the user.

In addition, the information obtaining unit may include: a first terminal information obtaining unit which receives a message transmitted by the first terminal and obtains the media information of the first terminal included in the message; a second terminal information obtaining unit which transmits a message including the media information of the first terminal to the second terminal, receives a message transmitted by the second terminal in response to the message, and obtains media information of the second terminal included in the message; and a third terminal information obtaining unit which transmits a message including the media information of the first terminal and the second terminal to the third terminal, receives a message transmitted by the third terminal in response to the message, and obtains the media information of the third terminal included in the message, and the second message transmitting unit which transmits a message including the media information of the third terminal to the first terminal and the second terminal.

With this structure, the connection device according to an aspect of the present invention can receive the media information of the second terminal and the third terminal by sending the messages to the second terminal and the third terminal in response to the originating message from the first terminal.

In addition, the information obtaining unit may include: a first terminal information obtaining unit which receives a third message transmitted by the first terminal and obtains the media information of the first terminal included in the third message; a second terminal information obtaining unit which receives a fourth message transmitted by the second terminal, and to obtain media information of the first terminal included in the fourth message; and a third terminal information obtaining unit which transmits a fifth message transmitted by the third terminal, and obtains the media information of the third terminal included in the fifth message, and the second message transmitting unit which transmits a message including the media information of the first terminal to the second terminal in response to the fourth message, transmits a message including the media information of the first terminal and the second terminal to the third terminal in response to the fifth message, and transmits a message including the media information of the third terminal to the first terminal and the second terminal.

With this structure, the connection device according to an aspect of the present invention obtains the media information of each of the terminals included in the messages transmitted by the first, second, and third terminals. Thus, only additional function necessary for the connection device according to an aspect of the present invention is the function for waiting for the origination from each terminal. Accordingly, the present invention contributes to the cost reduction for developing the connection device.

In addition, the first message transmitting unit may further transmit, to the second terminal, a sixth message which prevents the second terminal from starting a transmission of the media data to the first terminal and the third terminal, and transmit, to the third terminal, a seventh message which prevents the third terminal from starting a transmission of the media data to the first terminal and the second terminal, the information obtaining unit may include: a first terminal information obtaining unit which receives a message transmitted by the first terminal in response to the first message, and obtains the media information of the first terminal included in the message; a second terminal information obtaining unit which receives a message transmitted by the second terminal in response to the sixth message, and obtains media information of the second terminal included in the message; and a third terminal information obtaining unit which receives a message transmitted by the third terminal in response to the seventh message, and obtains the media information of the third terminal included in the message, and the second message transmitting unit which transmits a message including the media information of the third terminal to the first terminal, to transmit a message including the media information of the first terminal and the third terminal to the second terminal, and transmits a message including the media information of the first terminal and the second terminal to the third terminal.

With this structure, it is possible to implement conference communication in which the terminals directly send/receive the media data through an origination by the connection device. For example, the connection device according to an aspect of the present invention can implement a reserved-type conference in which the time of conference and conference participants are registered in the connection device; and a conference automatically starts at a registered time. Thus, the connection device according to an aspect of the present invention can improve the convenience for the user.

In addition, the media information may include at least one of an IP address, a port number, and an available codec.

In addition, the first message may include media information specifying at least one of a temporary IP address and a temporary port number.

With this structure, any value may be used as the media information included in the first message.

In addition, the temporary IP address may be an IP address of the connection device.

In addition, when the information obtaining unit does not obtain the media information of the second terminal but the media information of the third terminal, the first message transmitting unit may transmit, to the first terminal, the first message for preventing the first terminal from starting the transmission of the media data to the third terminal and not preventing the first terminal from starting the transmission of the media data to the second terminal.

With this structure, the connection device according to an aspect of the present invention does not prohibit the first terminal from starting the transmission of the media data to the terminals whose media information is obtained, and prohibits the first terminal from starting the transmission of the media data only to the terminals whose media information is not obtained. With this, the connection device according to the present invention can start the communication using only one piece of media data to the terminal capable of transmit/receive multiple type of media data. Thus, the connection device according to an aspect of the present invention can improve the convenience for the user.

In addition, when said information obtaining unit does not obtain the media information of the third terminal but the media information of the second terminal, after the first message is transmitted by said first message transmitting unit, the second message transmitting unit may transmit, to the first terminal, the second message (i) including the media information of the second terminal, (ii) for causing the first terminal to start transmitting the media data to the second terminal, and for (iii) continuing the prevention of the transmission of the media data to the third terminal.

With this structure, the connection device according to an aspect of the present invention causes the first terminal to start the transmission of the media data to the terminals whose media information is obtained, and continues the prevented status on the transmission of the media data only to the terminals whose media information is not obtained. With this, the connection device according to the present invention can start the communication using only one type of media data to the terminal capable of transmit/receive multiple types of media data. Thus, the connection device according to an aspect of the present invention can improve the convenience for the user.

In addition, the first message may be for holding the transmission of the media data to the second terminal and the third terminal.

With this structure, in the conference system including the connection device according to an aspect of the present invention each terminal may only have to include the holding function. This increases the types of terminals that can be used for the conference system including the connection device according to an aspect of the present invention. As a result, the connection device according to an aspect of the present invention can improve the convenience for the user.

In addition, the first message may be for causing the first terminal to prohibit the transmission and the reception, to prohibit the transmission, or to allow the reception only, with respect to the transmission and reception of the media data to and from the second terminal, the third terminal, and the connection device.

In addition, the first message may be compliant with the Session Initiation Protocol (SIP) and includes a=inactive, a=sendonly, or a=recvonly.

With this structure, the conference system using the SIP can implement the holding function.

In addition, the first message may specify "0.0.0.0" as an IP address of a destination of the media data.

With this structure, the conference system using the SIP can implement the holding function.

In addition, the first message may indicate that a terminal which is a callee is being called.

With this structure, in the conference system including the connection device according to an aspect of the present invention, each terminal may only have to include the receiving function of the calling message. This increases the types of terminals that can be used for the conference system including the connection device according to an aspect of the present invention. As a result, the connection device according to an aspect of the present invention can improve the convenience for the user.

In addition, the first message may be compliant with the Session Initiation Protocol (SIP), and may be a response message in the one hundreds.

With this structure, the conference system using the SIP can implement the holding function.

Furthermore, the connection method according to an aspect of the present invention is a connection method for a connection device which establishes a connection among a first terminal, a second terminal, and a third terminal for a multipoint conference in which media data is directly transmitted and obtained among the at least three terminals, the connection method including: transmitting, to the first terminal, a first message for preventing the first terminal from starting a transmission of the media data to the third terminal and the second terminal, when media information of the second terminal and the third terminal is not obtained by the information obtaining unit; obtaining the media information of the second terminal; and transmitting, to the first terminal, a second message (i) including the media information of the second terminal and (ii) for causing the first terminal to start transmitting the media data to the second terminal.

With this structure, the connection method according to an aspect of the present invention can cause the terminals to wait to start communicating until the media information of a callee is obtained. Accordingly, in a conference system including the connection method according to an aspect of the present invention, each of the terminals may only include a function to wait for the start of the communication. Therefore, the types of terminals that can be used for the conference system including the connection method according to an aspect of the present invention increase. As a result, the connection method according to an aspect of the present invention can improve the convenience for the user.

In addition, the connection method according to the present invention can cause a conference organizer terminal to wait to start communicating until the media information of the other terminals are obtained after receiving an originating message is received from the conference organizer terminal, even when the video conference starts in response to the origination from the conference organizer terminal.

With this structure, the connection device according to an aspect of the present invention can start the video conference in response to the origination from the terminals easily. With this, the connection method according to an aspect of the present invention can improve the convenience for the user.

Note that, the present invention may be implemented not only as a connection device, bust also as a connection method including the characteristic units included in the connection device as steps. Furthermore, the characteristic steps may also be implemented as a program executed by a computer. Needless to say, such a program may be distributed via recording media such as CD-ROM and transmission media such as the Internet. The present invention may also be implemented as a conference system including the connection device.

Effects of the Invention

As such, the present invention can provide a connection device which is highly convenient for the user and capable of implementing a multipoint conference without using a mixer, and a connection method.

BRIEF DESCRIPTION OF DRAWINGS

FIG. 3 is a sequence diagram illustrating the process flow in the video conference system according to Embodiment 1 of the present invention.

FIG. 4 illustrates the structure of INVITE according to Embodiment 1 of the present invention.

FIG. 5 illustrates the structure of 200 response according to Embodiment 1 of the present invention.

FIG. 6 illustrates the structure of REFER according to Embodiment 1 of the present invention.

FIG. 7 illustrates the structure of INVITE according to Embodiment 1 of the present invention.

FIG. 8 illustrates the structure of 200 response according to Embodiment 1 of the present invention.

FIG. 9 illustrates the structure of INVITE according to Embodiment 1 of the present invention.

FIG. 12 illustrates the structure of a modified 200 response according to Embodiment 1 of the present invention.

FIG. 25 illustrates the structure of INVITE according to Embodiment 4 of the present invention.

FIG. 30 illustrates the structure of INVITE according to Embodiment 5 of the present invention.

Figure 1:
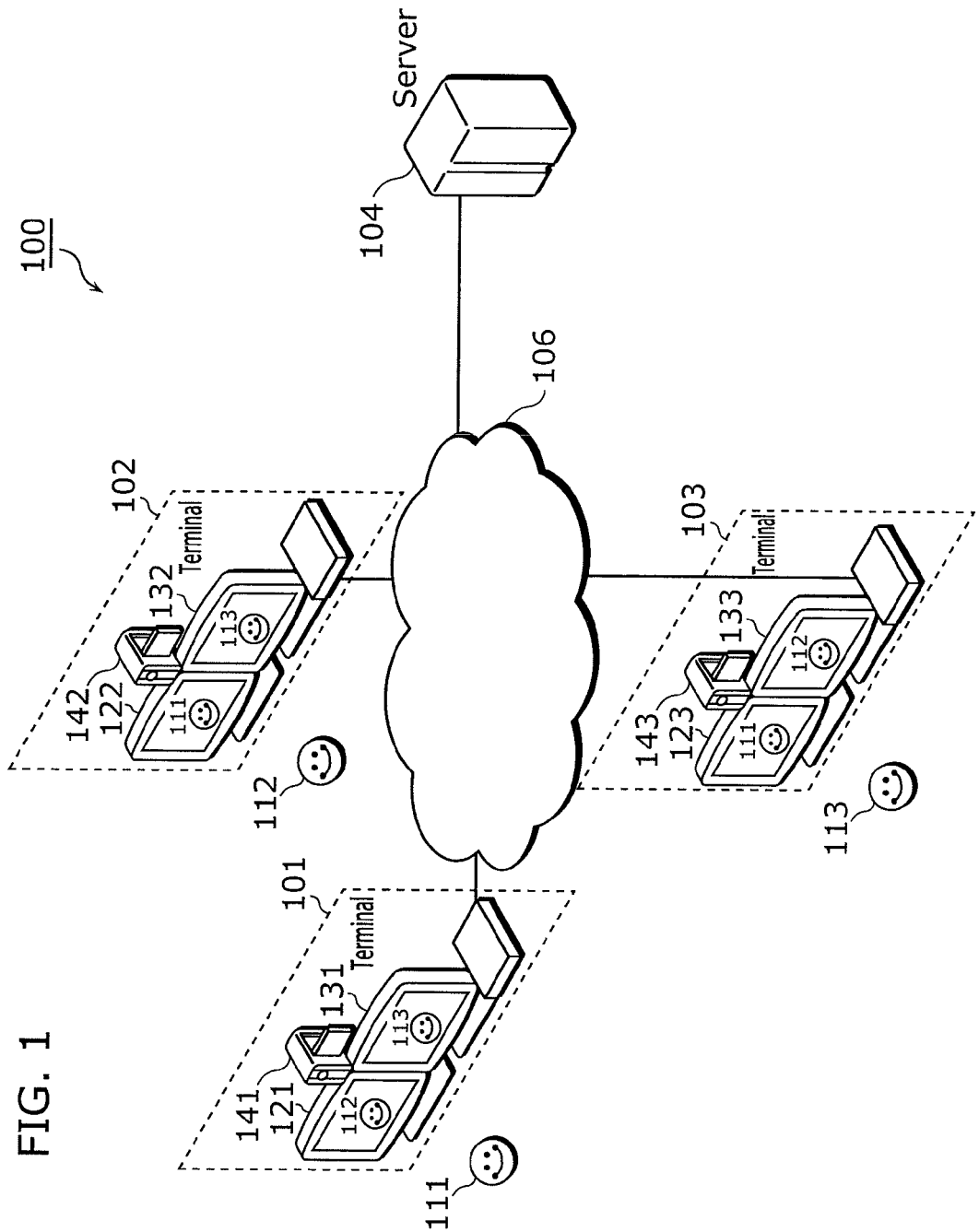
FIG. 1 illustrates the structure of the video conference system according to Embodiment 1 of the present invention.

NUMERICAL REFERENCES 100, 800, 900 Video conference system
101, 102, 103, 701, 702, 703, 801, 802, 803 Terminal
104, 704, 804 Server
106, 706, 806 Network
111, 112, 113, 811, 812, 813 User
121, 122, 123, 131, 132, 133, 821, 822, 823, 831, 832, 833 Monitor
141, 142, 143, 841, 842, 843 Camera 201 Control unit
202 Caller information obtaining unit
203 Callee information obtaining unit
204 Holding unit
205 Communication starting unit
206 Terminal information holding unit
214 Calling notification unit
300, 303, 308, 323, 328, 340, 342, 345, 363, 380 INVITE
301, 304, 306, 309, 311, 313, 324, 329, 341, 343, 346, 348, 350, 352, 364, 366, 371, 373, 390, 391, 392 200 response
302, 307, 322, 327 REFER
305, 310, 312, 347, 349, 351, 365, 370, 372, re-INVITE
381, 384, 389 180 response
401 IP address
402 Receiving port number
403 Available codec
404 Hold request
405 Refer-To header
406 Hold releasing request
407 Terminal count
700 Conference call system
705, 805, Mixers

BEST MODE FOR CARRYING OUT THE INVENTION

The following describes embodiments of the video conference system according to the present invention in detail with reference to the drawings.

Embodiment 1

In the video conference system according to Embodiment 1 of the present invention, the terminal organizing the video conference transmits an originating message to the server. The server first returns a hold message in response to the originating message. Subsequently, the server obtains the media information of the terminal that participates in the conference, and transmits a hold releasing message to the terminal which is the organizer. With this, the video conference system according to Embodiment 1 of the present invention can start a video conference without using mixer and by an origination from the terminal. Therefore, the video conference system according to Embodiment 1 of the present invention can improve the convenience for the user.

First, the structure of the video conference system according to Embodiment 1 of the present invention is described.

FIG. 1 illustrates the structure of the video conference system according to Embodiment 1 of the present invention.

A video conference system 100 illustrated in FIG. 1 is a multipoint video conference system using the SIP. The video conference system 100 includes terminals 101 to 103, a server 104, and a network 106.

The terminals 101 to 103 and the server 104 are connected via the network 106. The terminals 101 to 103 and the server 104 generate messages compliant with the SIP.

The network 106 is, for example, an internal LAN. Note that the network 106 may be an at-home network or the Internet.

The terminals 101 to 103 are video conference terminals used by the users 111 to 113.

The terminal 101 includes the camera 141, and the monitors 121 and 131. The terminal 102 includes the cameral 142 and the monitors 122 and 132. The terminal 103 includes the camera 143 and the monitors 123 and 133.

The monitors 121 to 123 and 131 to 133 display the video media data. The cameras 141 to 143 capture the video.

The terminals 101 to 103 transmit the video and audio data captured by the camera 141 to 143, respectively, to the other terminals 101 to 103 via the network 106.

The server 104 is a connection device which controls the connection among the terminals 101 to 103. The server 104 forms connections among the terminals 101 to 103. The connections are for a multipoint conference in which the terminals 101 to 103 directly transmit/receive the media data among the terminals 101 to 103. The server 104 controls the connections among the terminals 101 to 103 by sending/receiving the control message.

Figure 2:
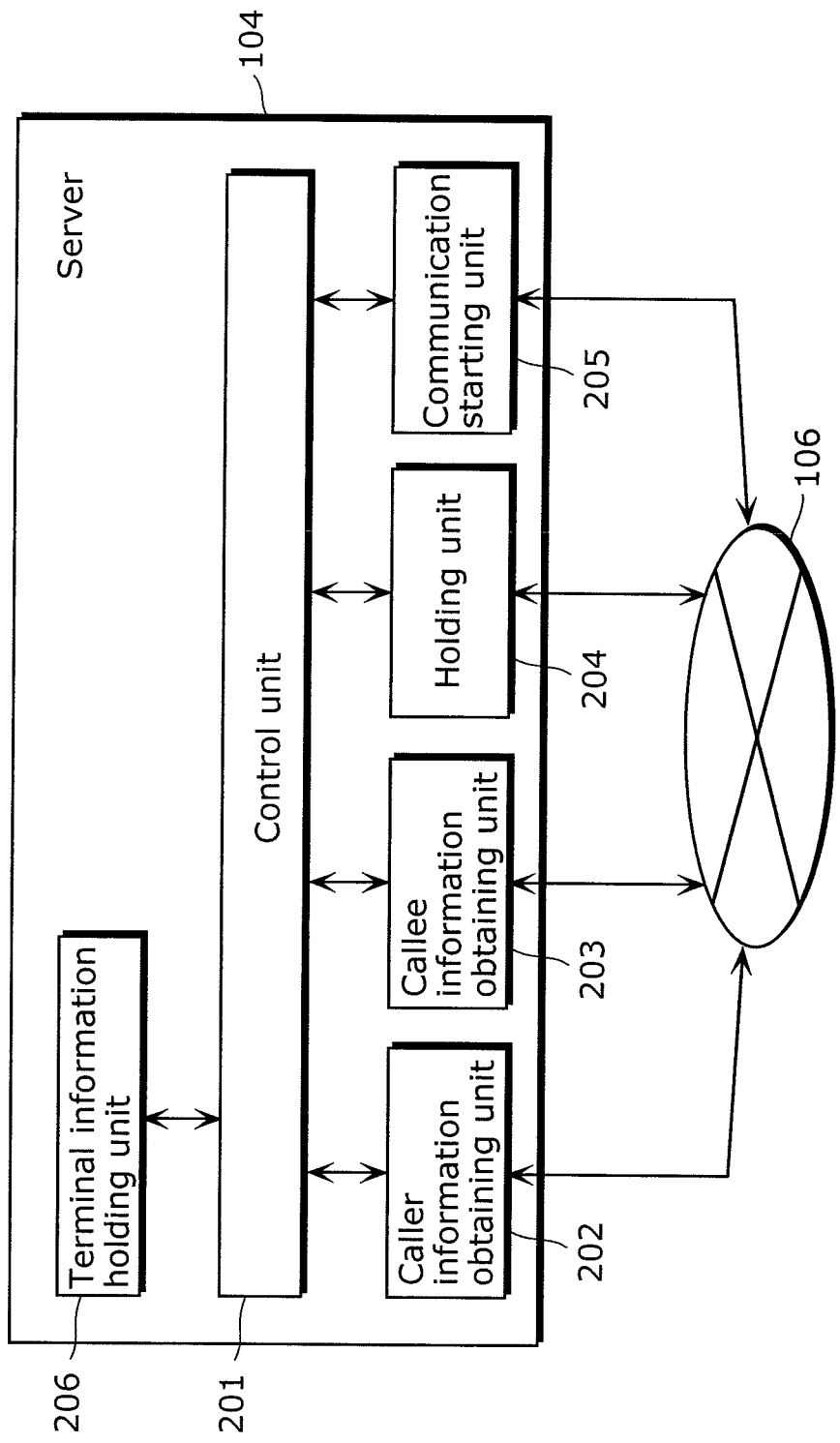
FIG. 2 illustrates the structure of the server according to Embodiment 1 of the present invention.

FIG. 2 is a block diagram illustrating the structure of the server 104.

The server 104 includes a control unit 201, a caller information obtaining unit 202, a callee information obtaining unit 203, a holding unit 204, a communication starting unit 205, and a terminal information holding unit 206.

The caller information obtaining unit 202 obtains media information of the caller which is the organizer of the video conference. The media information relates to transmission/reception of the media data among the terminals 101 to 103.

The callee information obtaining unit 203 receives the media information of a callee which is a terminal of participants of the video conference except for the caller.

The holding unit 204 generates a message including the hold request, and transmits the generated message to the caller. More specifically, the holding unit 204 transmits the message including the hold request to the caller, when the media information of the callee is not obtained by the callee information obtaining unit 203. This hold request is an instruction for holding the caller the transmission of the media data to the callee. In other words, the hold request is an instruction for preventing the caller from starting the transmission of the media data to the callee.

The communication starting unit 205 generates a message including a hold releasing request, and transmits the generated message to the caller. More specifically, the communication starting unit 205 receives a message including the hold request by the holding unit 204. Subsequently, the communication starting unit 205 transmits a message including the media information of the callee and a hold releasing request to the caller, when the callee information obtaining unit 203 obtains the media information of the callee. The hold releasing request is also an instruction for releasing the hold status set by the hold request. In other words, the hold releasing request is an instruction for causing the caller to start the transmission of the media data to the callee.

The terminal information holding unit 206 holds the media information of the terminals 101 to 103 obtained by the caller information obtaining unit 202 and the callee information obtaining unit 203.

The control unit 201 controls the caller information obtaining unit 202, the callee information obtaining unit 203, the holding unit 204, the communication starting unit 205, and the terminal information holding unit 206.

The following describes the operations of the video conference system 100 according to Embodiment 1 of the present invention.

FIG. 3 is a sequence diagram illustrating the process flow in the video conference system 100 according to Embodiment 1 of the present invention. FIG. 3 also illustrates the process flow when a video conference among the terminals 101 to 103 is organized by the terminal 101 (caller). Note that, in FIG. 3, ACK, REFER response, NOTIFY, NOTIFY response, and others are omitted.

First, the terminal 101 transmits INVITE 300 to the server 104 (S101).

FIG. 4 illustrates the configuration of INVITE 300.

INVITE 300 illustrated in FIG. 4 includes, as the media information of the terminal 101, an IP address 401, a receiving port number 402, and an available codec 403. Note that, the IP addresses of the terminals 101, 102, 103 and the server 104 are "192.168.1.1", "192.168.1.2", "192.168.1.3", and "192.168.1.4", respectively. In addition, FIG. 4 includes only the parameters necessary for the description, and other necessary SIP headers, SDP parameters and others are omitted. Furthermore, parameters other than the parameters necessary for the description are omitted in the following diagrams in the same manner as FIG. 4.

The receiving port number 402 is a port number used by the terminal or the server specified by the IP address 401 for receiving the media data. The available codec 403 is used by the terminal or the server specified by the IP address 401 for the received media data. Note that, the information including the IP address 401, the receiving port number 402 and the available codec 403 is referred to as the media information.

INVITE 300 includes sets of the receiving port numbers 402 and available codecs 403 each of which is for video and audio. Furthermore, the terminal 101 can transmit/receive two types of audio and two types of video. Thus, INVITE 300 includes the receiving port numbers 402 and the available codecs 403 each corresponding to a corresponding one of the two types of video and the two types of audio. Furthermore, the receiving port numbers 402 each of which corresponds to a corresponding one of the two types of video and the two types of audio are represented by different receiving port numbers.

When INVITE 300 is received, the server 104 checks whether or not the media information of the terminals 102 and 103 that are the destination terminals of the media data of the terminal 101 is obtained. Here, the server 104 has not obtained the media information of the terminals 102 and 103. Thus, the server 104 generates a 200 response 301 including the hold request, and transmits the generated 200 response 301 to the terminal 101 (S102).

FIG. 5 illustrates the configuration of the 200 response 301.

The 200 response 301 illustrated in FIG. 5 includes an IP address 401, a receiving port number 402, an available codec 403, and a hold request 404.

Here, the server 104 uses a=inactive as the hold request 404. Furthermore, a=inactive is an instruction to the terminal 101 to prohibit the transmission/reception of the media data to/from the server 104.

Furthermore, the media information included in the 200 response 301 (the IP address 401, the receiving port number 402, and the available codec 403) includes the media information of the server 104. In other words, the media information included in the 200 response 301 is the media information included in INVITE 300. Furthermore, when multiple available codecs 403 are described in INVITE 300, the server 104 selects an available codec 403 described in the 200 response 301 from among the multiple available codecs 403.

The terminal 101 which received the 200 response 301 transmits ACK in response to the 200 response 301 to the server 104. In addition, the terminal 101 becomes on hold, in response to the hold request 404 included in the 200 response 301. In other words, the terminal 101 does not transmit/receive the media data to/from the server 104 specified by the 200 response 301.

Next, the terminal 101 transmits REFER 302 to the server 104 to invite the terminal 102 to the conference (S104).

FIG. 6 illustrates the configuration of REFER 302. As illustrated in FIG. 6, REFER 302 includes a Refer-To header 405. The Refer-To header 405 describes the URI of the terminal 102. Note that, the terminal 102 may be invited using other methods such as HTTP, instead of REFER. In addition, the server 104 may set the terminal to participate in the video conference in advance.

When REFER 302 is received, the server 104 transmits the 202 response to the terminal 101. Furthermore, the server 104 transmits NOTIFY to the terminal 101 to notify the invited status. When NOTIFY is received, the terminal 101 transmits a 200 response to the server 104.

The server 104 transmits INVITE 303 including the media information of the terminal 101 to the terminal 102 (S105). For example, the configuration of INVITE 303 is similar to that of INVITE 300.

When INVITE 303 is received, the terminal 102 transmits the 200 response 304 including the media information of the terminal 102 (S106). Note that, the 200 response 304 is configured similarly to the 200 response 301, and includes the media information of the terminal 102. Furthermore, the 200 response 304 includes the receiving port numbers 402 and the available codecs 403, each of which corresponds to a corresponding one of two types of video and two types of audio.

When the 200 response 304 is received, the server 104 transmits ACK to the terminal 102. The terminal 102 starts transmitting the media data to the IP address 401 and the receiving port number 402 included in the media information of the terminal 101. Furthermore, the terminal 102 starts preparing the reception of the media data to the IP address 401 and the receiving port number 402 described in the media information of the terminal 102. Furthermore, the terminal 102 transmits/receives the media data using the codec described in the transmitted 200 response 304.

After transmitting ACK to the terminal 102, the server 104 transmits NOTIFY for notifying the completion of the invitation to the terminal 101. The terminal 101 transmits a 200 response in response to NOTIFY to the server 104.

Next, the server 104 generates re-INVITE 305 including the media information of the terminal 102, and transmits the generated re-INVITE 305 to the terminal 101 (S107).

FIG. 7 illustrates the configuration of re-INVITE 305.

Re-INVITE 305 illustrated in FIG. 7 includes the media information of the terminal 102. Re-INVITE 305 further includes a hold releasing request 406.

Here, the server 104 uses a=sendrecv as the hold releasing request 406. A=sendrecv is an instruction for causing the terminal 101 to release a prohibition for transmitting/receiving the media data to/from the server 104.

Furthermore, the media information included in re-INVITE 305 is the media information included in the 200 response 304 that the server 104 received from the terminal 102.

Note that, an example using re-INVITE 305 is described here. However, the server 104 may use another message such as UPDATE.

The terminal 101 which received re-INVITE 305 transmits the 200 response 306 including the media information of the terminal 101 to the server 104 (S108).

FIG. 8 illustrates the configuration of the 200 response 306. The 200 response 306 includes the media information of the terminal 101. Furthermore, the 200 response 306 includes the hold releasing request 406.

The terminal 101 starts transmitting the media data to the IP address 401 and the receiving port number 402 included in the media information of the terminal 102. Furthermore, the terminal 101 simultaneously starts preparing the reception of the media data to the IP address 401 and the receiving port number 402 described in the media information of the terminal 101. Furthermore, the terminal 101 transmits/receives the media data using the codec described in the transmitted 200 response 306.

The server 104 transmits ACK in response to the 200 response 306 to the terminal 101.

As such, the connection for directly transmitting/receiving the media data between the terminal 101 and the terminal 102 is established (S109). Here, the video transmitted from the terminal 102 is displayed on the monitors 121 and 131 of the terminal 101, and the video transmitted from the terminal 101 is displayed on the monitors 122 and 132 of the terminal 102.

Next, the terminal 101 transmits REFER 307 to the server 104 to invite the terminal 103 to the video conference (S110). The Refer-To header 405 included in REFER 307 describes the URI of the terminal 103.

When REFER 307 is received, the server 104 transmits a 202 response to the terminal 101. Furthermore, the server 104 transmits NOTIFY to the terminal 101 to notify the invited status. When NOTIFY is received, the terminal 101 transmits a 200 response to the server 104.

The server 104 then transmits INVITE 308 including the media information of the terminals 101 and 102 to the terminal 103 (S111).

FIG. 9 illustrates the configuration of INVITE 308. INVITE 308 illustrated in FIG. 9 includes the media information of both the terminals 101 and 102. Furthermore, INVITE 308 includes the receiving port numbers 402 and available codecs 403 each of which corresponds to a corresponding type of the video and audio.

When INVITE 308 is received, the terminal 103 transmits a 200 response 309 including the media information of the terminal 103 to the server 104 (S112). Note that, the 200 response 309 is configured similarly to the 200 response 301, and includes the media information of the terminal 103. Furthermore, the 200 response 309 includes the receiving port numbers 402 and the available codecs 403 each of which corresponds to a corresponding type of the two types of video or the two types of audio.

When the 200 response 309 is received, the server 104 transmits ACK to the terminal 103. The terminal 103 starts transmitting the media data to the IP address 401 and the receiving port number 402 included in the media information of the terminals 101 and 102. Furthermore, the terminal 103 simultaneously starts preparing the reception of the media data to the IP address 401 and the receiving port number 402 described in the media information of the terminal 103. Furthermore, the terminal 103 transmits/receives the media data using the codec described in the transmitted 200 response 309.

Next, the server 104 transmits re-INVITE 310 for changing the destination of the media data to the terminal 101 (S113). Re-INVITE 310 includes the media information of the terminals 102 and 103.

The terminal 101 which received re-INVITE 310 transmits the 200 response 311 including the media information of the terminal 101 to the server 104 (S114). When the 200 response 311 is received, the server 104 transmits ACK to the terminal 101.

Next, the server 104 transmits re-INVITE 312 for changing the destination of the media data to the terminal 102 (S115). Re-INVITE 312 includes the media information of the terminals 101 and 103.

The terminal 102 which received re-INVITE 312 transmits the 200 response 313 including the media information of the terminal 102 to the server 104 (S116). When the 200 response 313 is received, the server 104 transmits ACK to the terminal 102.

The terminal 101 starts transmitting the media data to the IP address 401 and the receiving port number 402 included in the media information of the terminals 102 and 103. Furthermore, the terminal 101 simultaneously starts preparing the reception of the media data to the IP address 401 and the receiving port number 402 described in the media information of the terminal 101. Furthermore, the terminal 101 transmits/receives the media data using the codec described in the transmitted 200 response 306.

The terminal 102 starts transmitting the media data to the IP address 401 and the receiving port number 402 included in the media information of the terminals 101 and 103. Furthermore, the terminal 102 simultaneously starts preparing the reception of the media data to the IP address 401 and the receiving port number 402 described in the media information of the terminal 102. Furthermore, the terminal 101 transmits/receives the media data using the codec described in the transmitted 200 response 306.

As such, a connection for directly transmitting/receiving the media data is established between the terminals 101 and 103. In addition, a connection for directly transmitting/receiving the media data is established between the terminals 101 and 102 (S118). In addition, a connection for directly transmitting/receiving the media data is established between the terminals 102 and 103 (S119). Thus, a multipoint video conference in which media data is directly transmitted/received can be organized among the terminals 101 and 103.

Furthermore, the monitors 121 and 131 in the terminal 101 displays the video transmitted form the terminals 102 and 103, respectively. Furthermore, the monitors 122 and 132 in the terminal 102 display the video transmitted from the terminals 101 and 103, respectively. Furthermore, the monitors 123 and 133 in the terminal 103 display the video transmitted from the terminals 101 and 102, respectively.

The detailed operation of the server 104 shall be described next.

The following description concerns the operation of the server 104 establishing a video conference connection between the two terminals 101 and 102.

Figure 10:
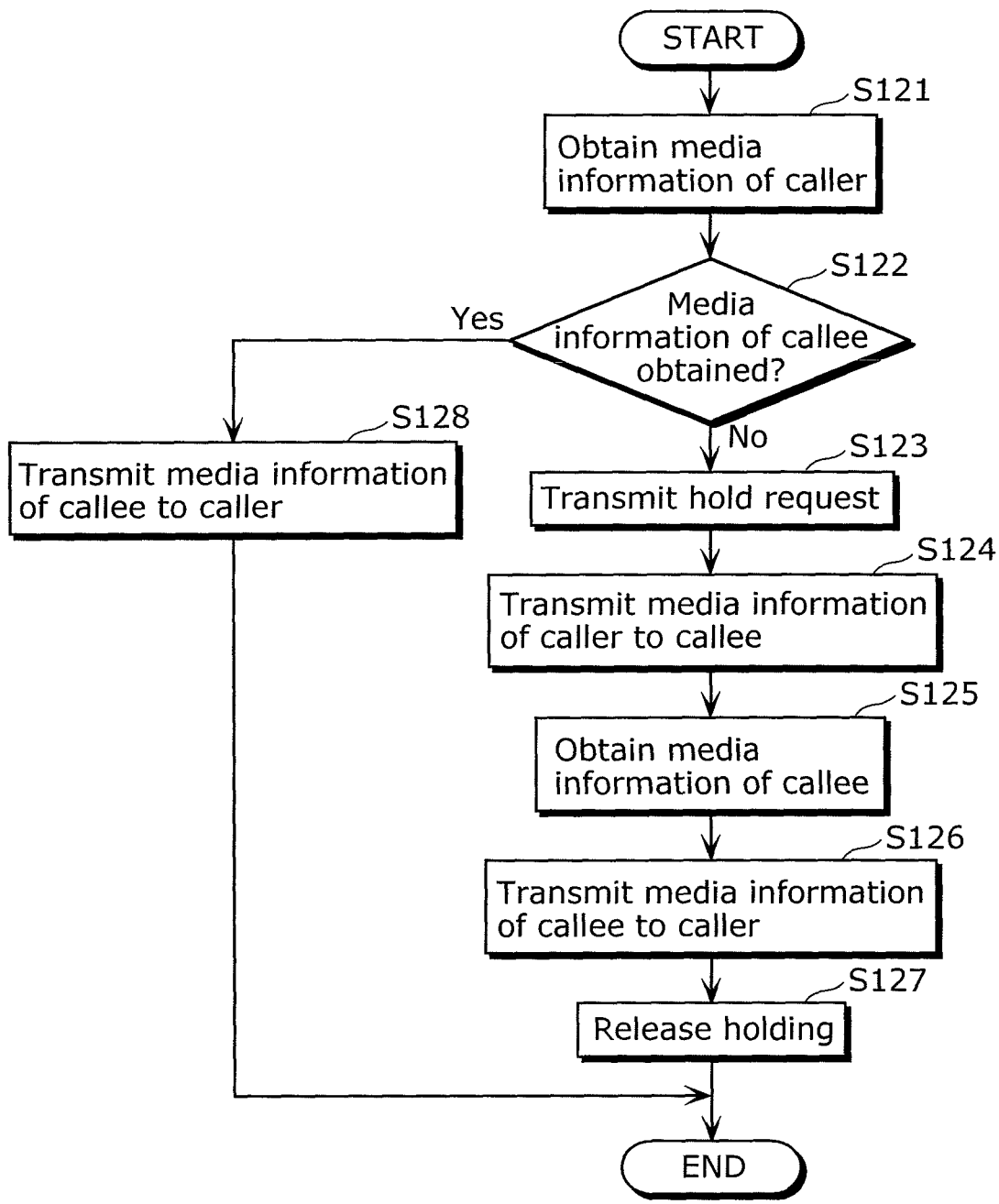
FIG. 10 is a flowchart illustrating the process flow of the server according to Embodiment 1 of the present invention.

FIG. 10 is a flowchart illustrating the process flow of the server 104 for organizing the video conference between the two terminals 101 and 102. Note that, in FIG. 10, transmissions/receptions such as REFER response, NOTIFY, NOTIFY response, and ACK are omitted for the simplicity of the description.

First of all, the caller information obtaining unit 202 in the server 104 receives INVITE 300 transmitted by the terminal 101 which is the caller. The caller information obtaining unit 202 obtains the media information of the terminals 101 included in INVITE 300 (S121).

The caller information obtaining unit 202 passes the received media information to the control unit 201. The control unit 201 stores the received media information of the terminal 101 in the terminal information holding unit 206.

Next, the control unit 201 determines whether or not the media information of the callee is received (S122). More specifically, the control unit 201 searches for the terminal information holding unit 206, and determines whether or not the media information of the terminals 102 and 103 which are the callees is stored or not.

When the media information of the terminals 102 and 103 is not obtained (No in S122), the holding unit 204 generates the 200 response 301 including the hold request and transmit the 200 response 301 to the terminal 101 (S123).

Next, the server 104 waits for the reception of REFER 302 for inviting the terminal 102 transmitted from the terminal 101. When REFER 302 is received, the callee information obtaining unit 203 passes the URI of the terminal 102 described in REFER 302 to the control unit 201.

Next, the server 104 transmits the media information of the terminal 101 to the terminal 102 (S124).

More specifically, the control unit 201 obtains the media information of the terminal 101 to be stored in the terminal information holding unit 206. The control unit 201 then passes the obtained media information of the terminal 101 to the callee information obtaining unit 203. The callee information obtaining unit 203 further generates INVITE 303 including the media information of the terminal 101, and transmits the generated INVITE 303 to the terminal 102.

Here, it is necessary for the callee information obtaining unit 203 to obtain the correspondence relationship between the URIs of the terminals 102 and 103 and the IP addresses of the terminals 102 and 103, respectively. For example, the callee information obtaining unit 203 receives REGISTER transmitted from the terminals 102 and 103 describing the correspondence relationship between URI and IP address. Through this process, the callee information obtaining unit 203 obtains the correspondence relationship between the URIs of the terminals 102 and 103 and the IP addresses of the terminals 102 and 103, respectively.

The callee information obtaining unit 203 then receives the 200 response 304 including the media information of the terminal 102. The callee information obtaining unit 203 then receives the media information of the terminal 102 included in the 200 response 304 (S125).

Subsequently, the callee information obtaining unit 203 passes the obtained media information of the terminal 102 to the control unit 201. The control unit 201 stores the received media information of the terminal 102 in the terminal information holding unit 206. Furthermore, the control unit 201 passes the media information of the terminal 102 to the communication starting unit 205.

Next, the server 205 transmits the media information of the terminal 102 to the terminal 101 (S126). Furthermore, the communication starting unit 205 releases the holding status of the terminal 101 (S127). More specifically, the communication starting unit 205 generates re-INVITE 305 including the media information of the terminal 102 and the hold releasing request 406, and transmits the generated re-INVITE 305 to the terminal 101. Subsequently, the server 104 receives the 200 response 306 from the terminal 101.

With the processes described above, the communication between the terminals 101 and 102 starts through the mutual transmission of the media information of the terminals 101 and 102.

On the other hand, when the media information of the terminal 102 has been obtained (Yes in S122), the control unit 201 passes the media information of the terminal 102 to the communication starting unit 205. The communication starting unit 205 then generates a 200 response including the media information of the terminal 102 and transmits the generated 200 response to the terminal 101 such that the media information of the terminal 102 is sent to the terminal 101 (S128).

With this, the communication between the terminals 101 and 102 is started.

Next, with the connection for the video conference being established between the terminals 101 and 102, operations of the server 104 for establishing a video conference connection for three parties; that is, adding the terminal 103 shall be described.

Figure 11:
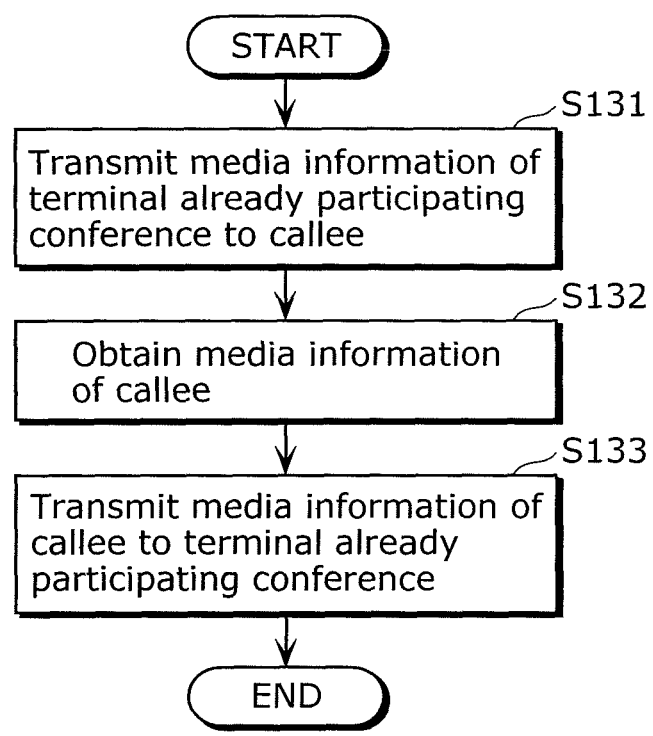
FIG. 11 is a flowchart illustrating the process flow of the server according to Embodiment 1 of the present invention.

FIG. 11 is a flowchart illustrating the process flow of the server 104 for organizing a three-party video conference further including the terminal 103.

The callee information obtaining unit 203 receives REFER 307 from the terminal 101. The callee information obtaining unit 203 then passes the URI of the terminal 103 included in REFER 307 to the control unit 201.

The server 104 transmits the media information of the terminals 101 and 102 to the terminal 103 (S131).

More specifically, the control unit 201 obtains the media information stored in the terminal information holding unit 206 of the terminals 101 and 102 that have been in the conference. The control unit 201 then passes the obtained media information to the callee information obtaining unit 203. The callee information obtaining unit 203 subsequently generates INVITE 308 including the media information of the terminals 101 and 102, and transmits the generated INVITE 308 to the terminal 103.

The server 104 then obtains the media information of the terminal 103 (S132).

More specifically, the callee information obtaining unit 203 receives the 200 response 309 including the media information of the terminal 103. The callee information obtaining unit 203 then obtains the media information of the terminal 103 included in the 200 response 309. Subsequently, the callee information obtaining unit 203 passes the obtained media information of the terminal 103 to the control unit 201. The control unit 201 stores the received media information of the terminal 103 in the terminal information holding unit 206. The control unit 201 also passes the media information of the terminal 103 and the terminals 101 and 102 that have already been in the conference to the communication starting unit 205.

The communication starting unit 205 generates re-INVITE 310 and 312 which are session updating INVITE including the media information of the terminal 103 and the terminals 101 and 102 that have already been in the conference, and transmits the generated re-INVITE 310 and 312 to the terminals 101 and 102, respectively. With this, the server 104 transmits the media information of the terminal 103 to the terminals 101 and 102 that have already been in the conference (S133). More specifically, the communication starting unit 205 transmits re-INVITE 310 including the media information of the terminals 102 and 103 to the terminal 101, and transmits re-INVITE 312 including the media information of the terminals 101 and 103 to the terminal 102. The server 104 receives 200 responses 311 and 313 from the terminals 101 and 102, respectively.

As such, the video conference connection among the three parties; namely, the terminals 101, 102, and 103 is established.

Note that, although the operations of the server 104 for starting a three-party conference in the middle of a two-party conference have been described, the operations of the server 104 for starting a four-party conference during a three-party conference is the same.

In addition, although a=inactive is used as the hold request 404 in the description above, another instruction may also be used.

Figure 13:
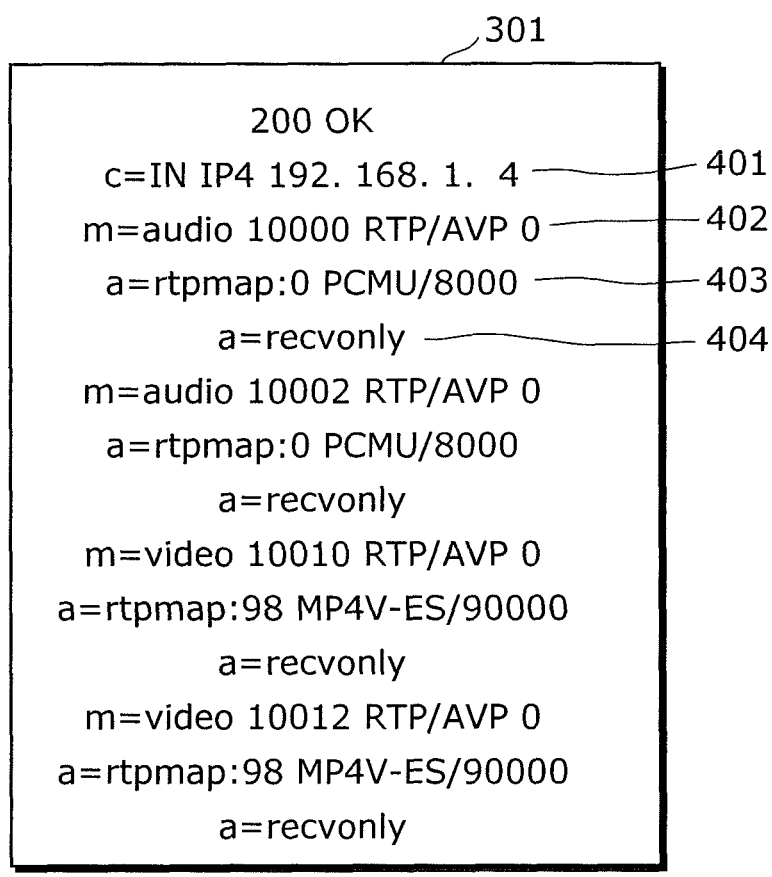
FIG. 13 illustrates the structure of a modified 200 response according to Embodiment 1 of the present invention.
Figure 14:
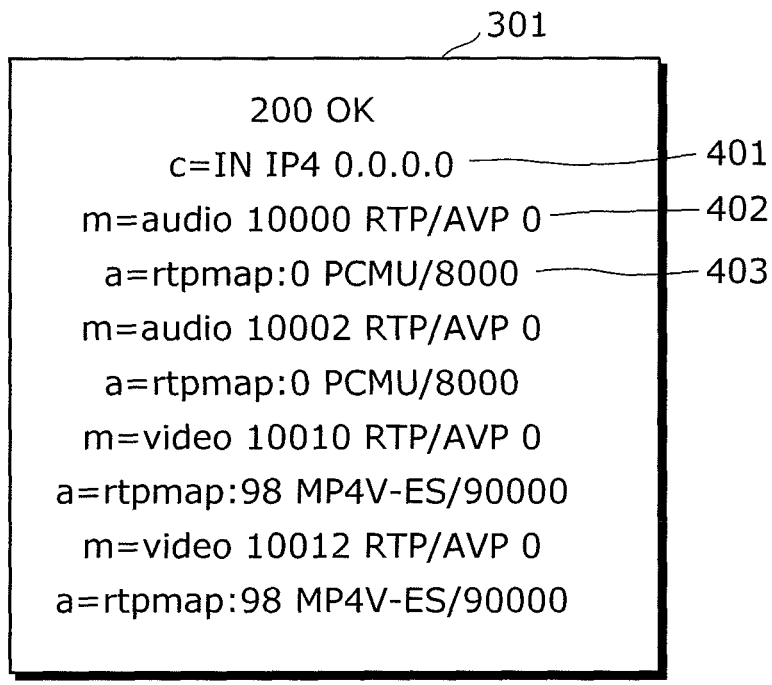
FIG. 14 illustrates the structure of a modified 200 response according to Embodiment 1 of the present invention.

FIGS. 12, 13, and 14 illustrate modifications of the 200 response 301 including the hold request 404.

As illustrated in FIG. 12, a=sendonly may be used as the hold request 404. The instruction a=sendonly is an instruction for prohibiting the terminal 101 from transmitting the media data to the server 104.

As illustrated in FIG. 13, a=recvonly may also be used as the hold request 404. The instruction a=recvonly allows the terminal 101 to receive the media data only.

In addition, as illustrated in FIG. 14, the IP address 401 may specify "0.0.0.0". Here, the specified version of SIP (for example, RFC 2543) can send a hold request by specifying "0.0.0.0" in the IP address 401.

In addition, in the abovementioned description, the media information included in the 200 response 301 including the hold request 404 is the media information of the server 104. However, any temporary media information may be specified. For example, the temporary IP address 401 may describe an invalid IP address and others. Furthermore, the temporary receiving port number 402 may describe a random value. In addition, one of the IP address 401 and the receiving port number 402 may be a temporary value.

Furthermore, although a=sendrecv is used as the hold releasing request 406 in the description, the hold releasing request 406 may be omitted.

Figure 15:
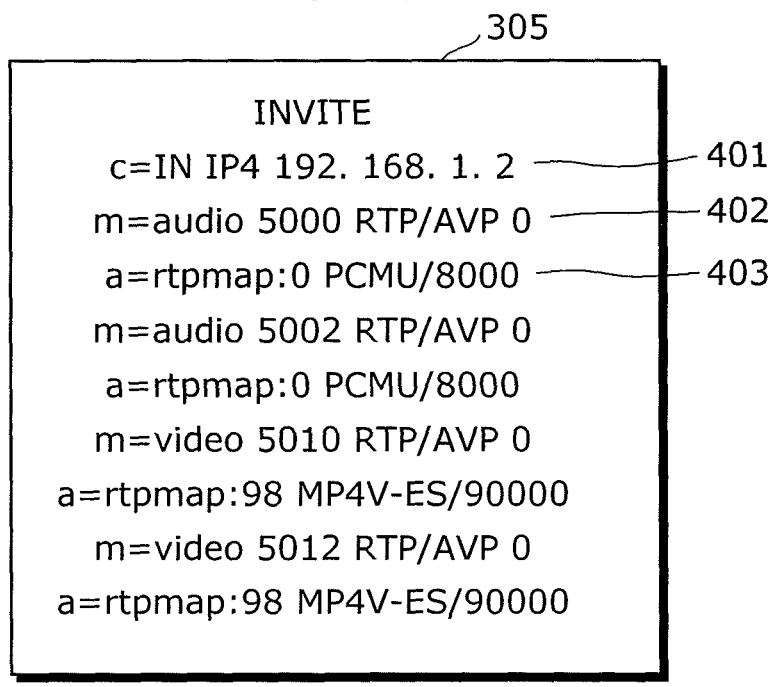
FIG. 15 illustrates the structure of a modified INVITE according to Embodiment 1 of the present invention.

FIG. 15 illustrates the configuration of re-INVITE 305 when the hold releasing request 406 is omitted. As illustrated in FIG. 15, re-INVITE 305 can request the terminal 101 to release the hold by omitting the hold releasing request 406.

Note that, the modifications of the 200 response 301 including the hold request 404 as described above may be applied to Embodiments 2 to 5 to be described below.

As described above, in the video conference system 100 according to Embodiment 1 of the present invention, the terminal 101 transmits INVITE 300 which is an originating message to the server 104. In response to the originating message, the server 104 transmits the 200 response 301 including the hold request 404 to the terminal 101. After receiving the media information of the terminal 102, the server 104 transmits re-INVITE 305 including the hold releasing request 406 to the terminal 101.

With this, the terminals 101 to 103 can directly transmit/receive media data among the terminals. In other words, the video conference system 100 can perform a video conference communication among the terminals 101 to 103 without a mixer. Therefore, the video conference system 100 according to Embodiment 1 of the present invention can reduce the cost for constructing a system.

Furthermore, the video conference system 100 does not transmit/receive the media data through the mixer. This eliminates a delay generated in the mixer. Therefore, the video conference system 100 can reduce the delay in transmitting/receiving the media data.

Furthermore, in the video conference system 100, even when the terminal 101 starts the video conference through origination, the server 104 holds the transmission of the media data of the terminal 101 until the media information of the other terminals 102 and 103 is obtained. With this, the video conference starts from the origination from the terminals 101 to 103, thereby increasing the convenience for the user.

Furthermore, in the video conference system 100, the hold function while transmitting/receiving the media data is the only additional function necessary for the terminals 101 to 103. This increases the types of terminals available for the video conference system 100, and thereby facilitating the construction of the video conference system 100.

Embodiment 2

In the video conference system 100 according to Embodiment 1, the server 104 transmits INVITE 303 for obtaining the media information of the terminals 102 and 103 which are the callees. In contrast, in the video conference system 100 according to Embodiment 2, the terminals 102 and 103 transmits INVITE including the media information of the terminals 102 and 103 to the server 104.

The structure of the video conference system 100 according to Embodiment 2 is similar to the structure illustrated in FIG. 1. Accordingly, the description is omitted. In addition, the structure of the server 104 according to Embodiment 2 is similar to the structure illustrated in FIG. 2. Accordingly, the description is omitted.

Figure 16:
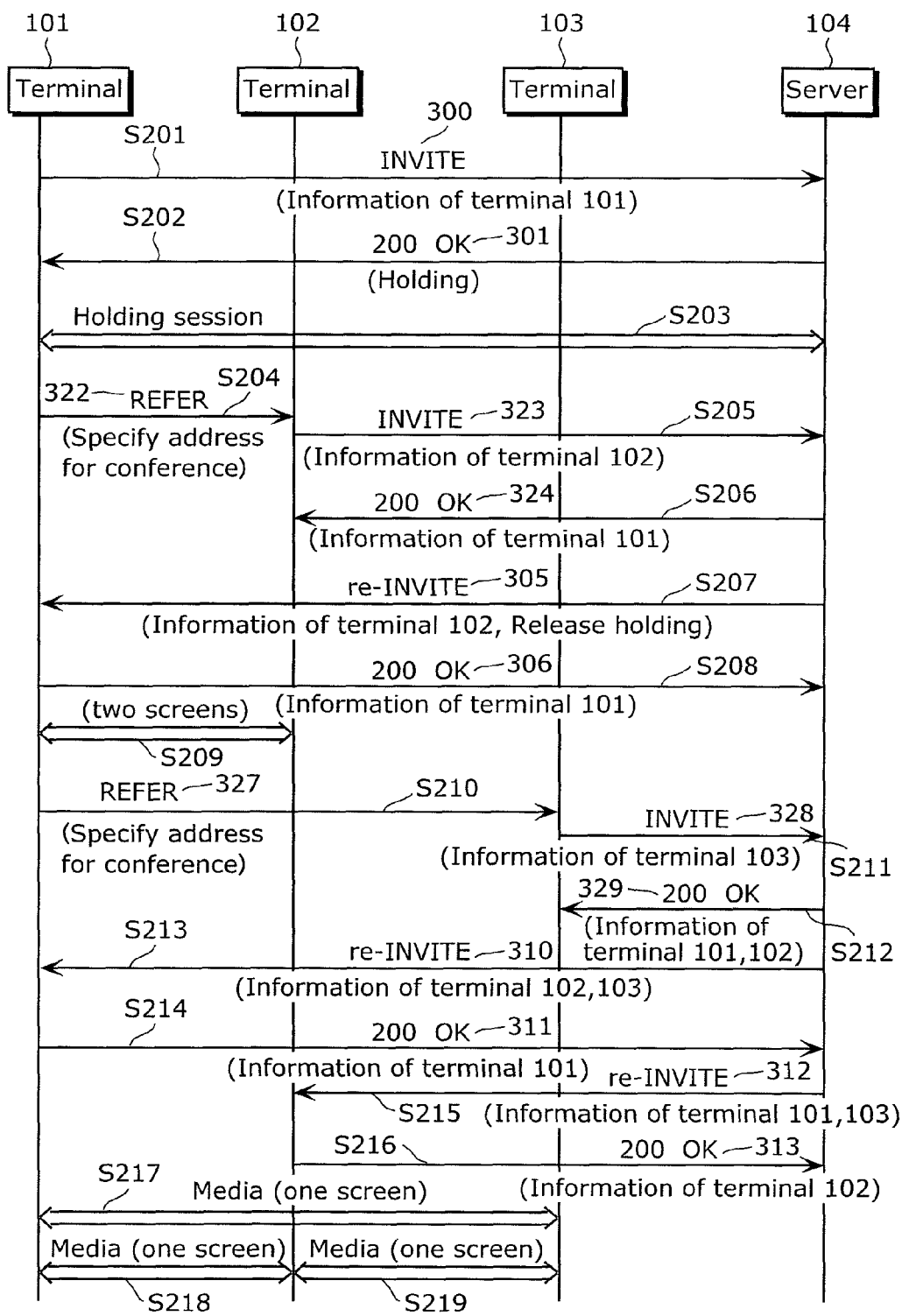
FIG. 16 is a sequence diagram illustrating the process flow in the video conference system according to Embodiment 2 of the present invention.

FIG. 16 is a sequence diagram illustrating the process flow in the video conference system 100 according to Embodiment 2 of the present invention. FIG. 16 further illustrates the process flow for a video conference among the terminals 101 to 103 organized by the terminal 101 (caller). Note that, the reference numerals same as FIG. 3 are assigned to the components similar to the components in FIG. 3. Thus, descriptions for these components are omitted, and only the difference is described. Note that, in FIG. 16, ACK, REFER response, NOTIFY, NOTIFY response, and others are omitted.

The process in steps S201 to S203 illustrated in FIG. 16 is similar to the process in steps S101 to S103 illustrated in FIG. 3.

After step S203, the terminal 101 transmits REFER 322 to the terminal 102 to invite the terminal 102 to the conference (S204).

Figure 17:
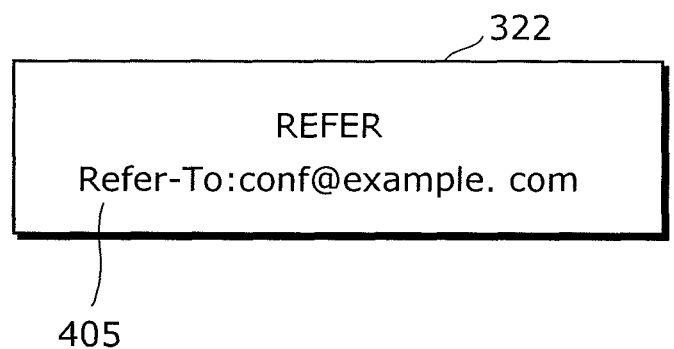
FIG. 17 illustrates the structure of REFER according to Embodiment 2 of the present invention.

FIG. 17 illustrates the configuration of REFER 322. As illustrated in FIG. 17, REFER 322 includes a Refer-To header 405. An URI for conference is described in the Refer-To header 405.

The terminal 102 which received REFER 322 transmits INVITE 323 including the media information of the terminal 102 to the server 104 (S205). For example, the media information included in INVITE 323 is identical to the media information included in the 200 response 304 illustrated in FIG. 3.

The server 104 transmits the 200 response 324 including the media information of the terminal 101 to the terminal 102 (S206).

The process in steps S207 to S209 is similar to the process in steps S107 to S109 illustrated in FIG. 3. Accordingly, the description for the process is omitted.

After step S209, the terminal 101 transmits REFER 327 to the terminal 103 to invite the terminal 103 to the conference (S210). The Refer-To header 405 included in REFER 327 describes an URI for conference.

The terminal 103 which received REFER 327 transmits INVITE 328 including the media information of the terminal 103 to the server 104 (S211).

The server 104 transmits a 200 response 329 including the media information of the terminals 101 and 102 to the terminal 103 (S212).

The process in steps S213 to S219 is similar to the process in steps S113 to S119 illustrated in FIG. 3. Accordingly, the description for the process is omitted.

As such, a connection for directly transmitting/receiving the media data is established between the terminals 101 and 103 (S217). In addition, a connection for directly transmitting/receiving the media data is established between the terminals 101 and 102 (S218). In addition, a connection for directly transmitting/receiving the media data is established between the terminals 102 and 103 (S219). Thus, a multipoint video conference in which media data is directly transmitted/received can be organized among the terminals 101 and 103.

The following specifically describes the operations of the server 104 according to Embodiment 2.

Note that, the description for the operations similar to the operations of the server 104 according to Embodiment 1 is omitted, and only the differences shall be described.

The following description concerns the operation of the server 104 according to Embodiment 2 establishing a video conference connection between the two terminals 101 and 102.

Figure 18:
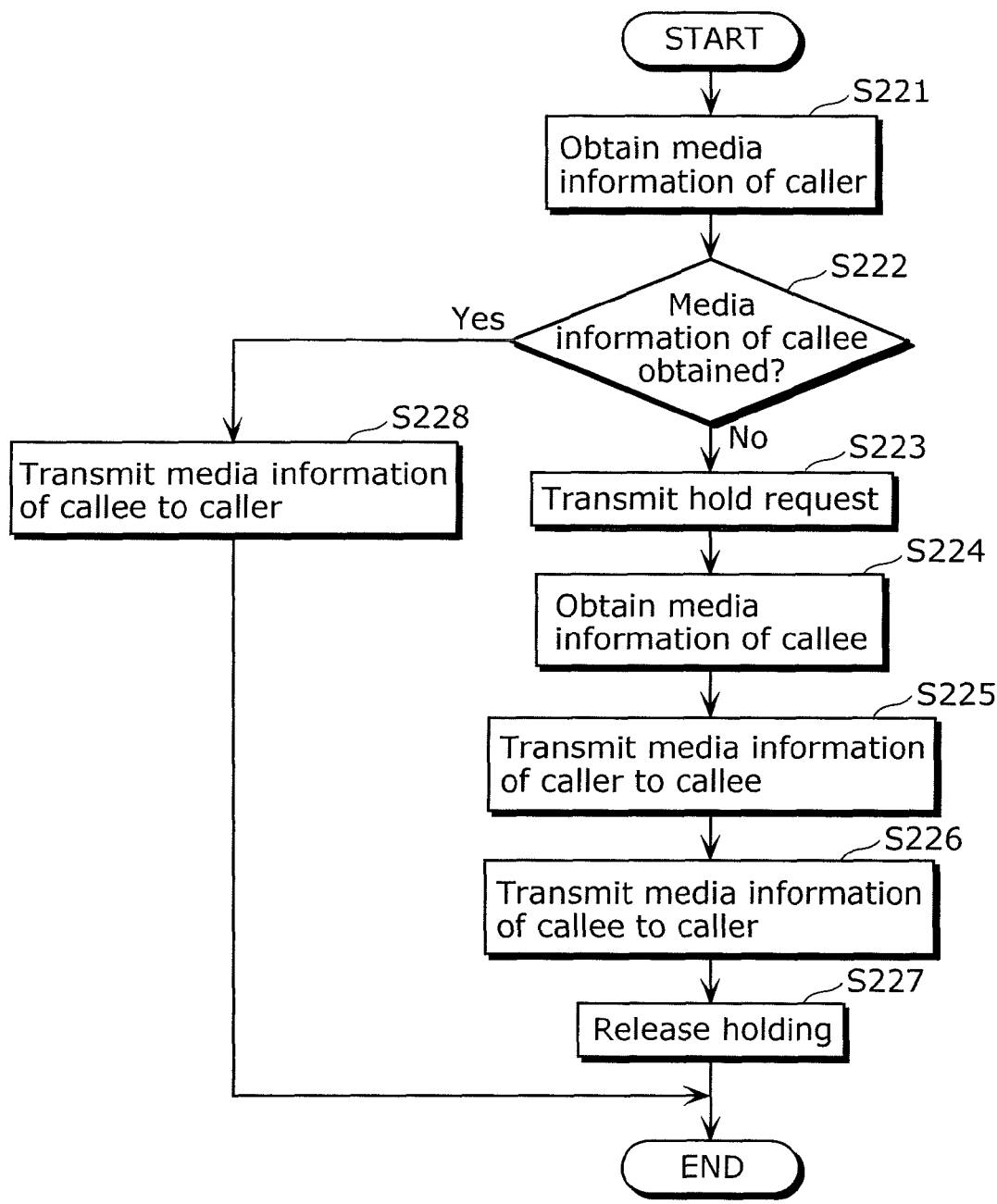
FIG. 18 is a flowchart illustrating the process flow of the server according to Embodiment 2 of the present invention.

FIG. 18 is a flowchart illustrating the process flow of the server 104 according to Embodiment 2 for organizing a video conference between the two terminals 101 and 102. Note that, in FIG. 18, REFER response, NOTIFY, NOTIFY response, and ACK are omitted for the simplicity of description.

The processes in steps S221 to S223 and S226 to S228 are similar to the processes in steps S121 to S123 and S126 to S128 illustrated in FIG. 10. Accordingly, the descriptions for the processes are omitted.

After step S223, the server 104 waits for the reception of INVITE 323 transmitted from the terminal 102 which is the callee.

When INVITE 323 is received, the callee information obtaining unit 203 obtains the media information of the terminal 102 included in INVITE 323 (S224).

Subsequently, the callee information obtaining unit 203 passes the obtained media information of the terminal 102 to the control unit 201. The control unit 201 stores the received media information of the terminal 102 in the terminal information holding unit 206.

Next, the server 104 transmits the media information of the terminal 101 to the terminal 102 (S225).

More specifically, the control unit 201 obtains the media information of the terminal 101 to be stored in the terminal information holding unit 206. The control unit 201 then passes the obtained media information of the terminal 101 to the callee information obtaining unit 203. The callee information obtaining unit 203 then generates a 200 response 324 including the media information of the terminal 101, and transmits the generated 200 response 324 to the terminal 102.

With this, the communication between the terminals 101 and 102 is started.

Next, with the connection for the video conference being established between the terminals 101 and 102, operations of the server 104 for establishing a video conference connection for three parties; that is, adding the terminal 103 shall be described.

Figure 19:
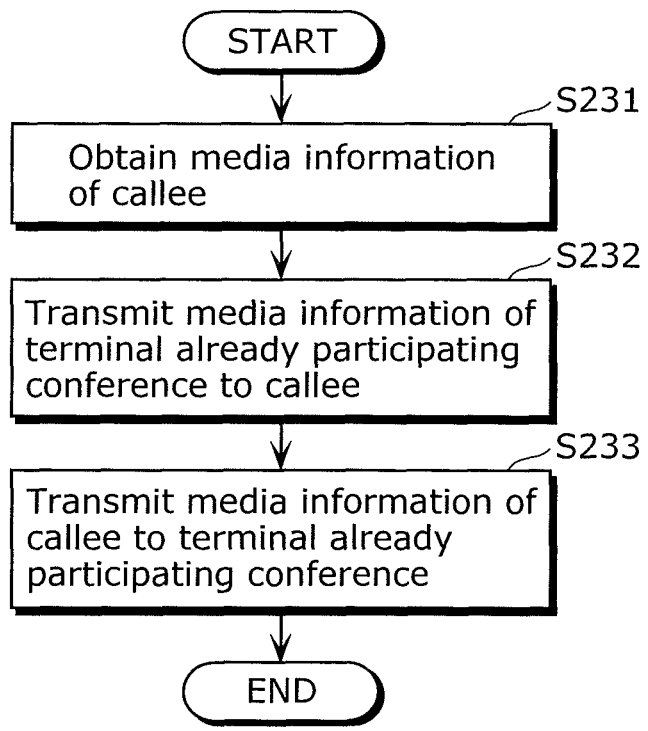
FIG. 19 is a flowchart illustrating the process flow of the server according to Embodiment 2 of the present invention.

FIG. 19 is a flowchart illustrating the process flow of the server 104 according to Embodiment 2 for organizing a three-party video conference adding the terminal 103.

The server 104 first obtains the media information of the terminal 103 which is the callee (S231).

More specifically, the callee information obtaining unit 203 receives INVITE 328 including the media information of the terminal 103 transmitted from the terminal 103. The caller information obtaining unit 203 obtains the media information of the terminals 103 included in INVITE 328. Subsequently, the callee information obtaining unit 203 passes the obtained media information of the terminal 103 to the control unit 201. The control unit 201 subsequently stores the media information of the terminal 103 in the terminal information holding unit 206.

The server 104 subsequently transmits the media information of the terminals 101 and 102 that have already been in the conference to the terminal 103 (S232).

More specifically, the control unit 201 obtains the media information stored in the terminal information holding unit 206 of the terminals 101 and 102 that have been in the conference. Next, the control unit 201 passes the obtained media information of the terminals 101 and 102 to the callee information obtaining unit 203. The callee information obtaining unit 203 subsequently generates the 200 response 329 including the media information of the terminals 101 and 102, and transmits the generated 200 response 329 to the terminal 103.

Note that, the process in step S233 is similar to step S133 illustrated in FIG. 11. Accordingly, the description for the process is omitted.

As such, the video conference connection among the three parties; namely, the terminals 101, 102, and 103 is established.

As such, the video conference system 100 according to Embodiment 2 of the present invention can perform a video conference communication among the terminals 101 to 103 without a mixer, in the same manner as the video conference system 100 according to Embodiment 1. Therefore, the video conference system 100 according to Embodiment 2 of the present invention can reduce the cost for constructing a system. The video conference system 100 can also reduce the delay in transmitting/receiving the media data.

Furthermore, the video conference system 100 can start the video conference by the origination from the terminal 101. This increases the convenience for the user.

Furthermore, in the video conference system 100, the function to wait for the origination from the terminal 101 to 103 is the only additional function necessary for the server 104. Therefore, the cost for developing the server 104 according to Embodiment 2 can be reduced.

Embodiment 3

An example in which a video conference starts by an origination from the server 104 shall be described in Embodiment 3.

Figure 20:
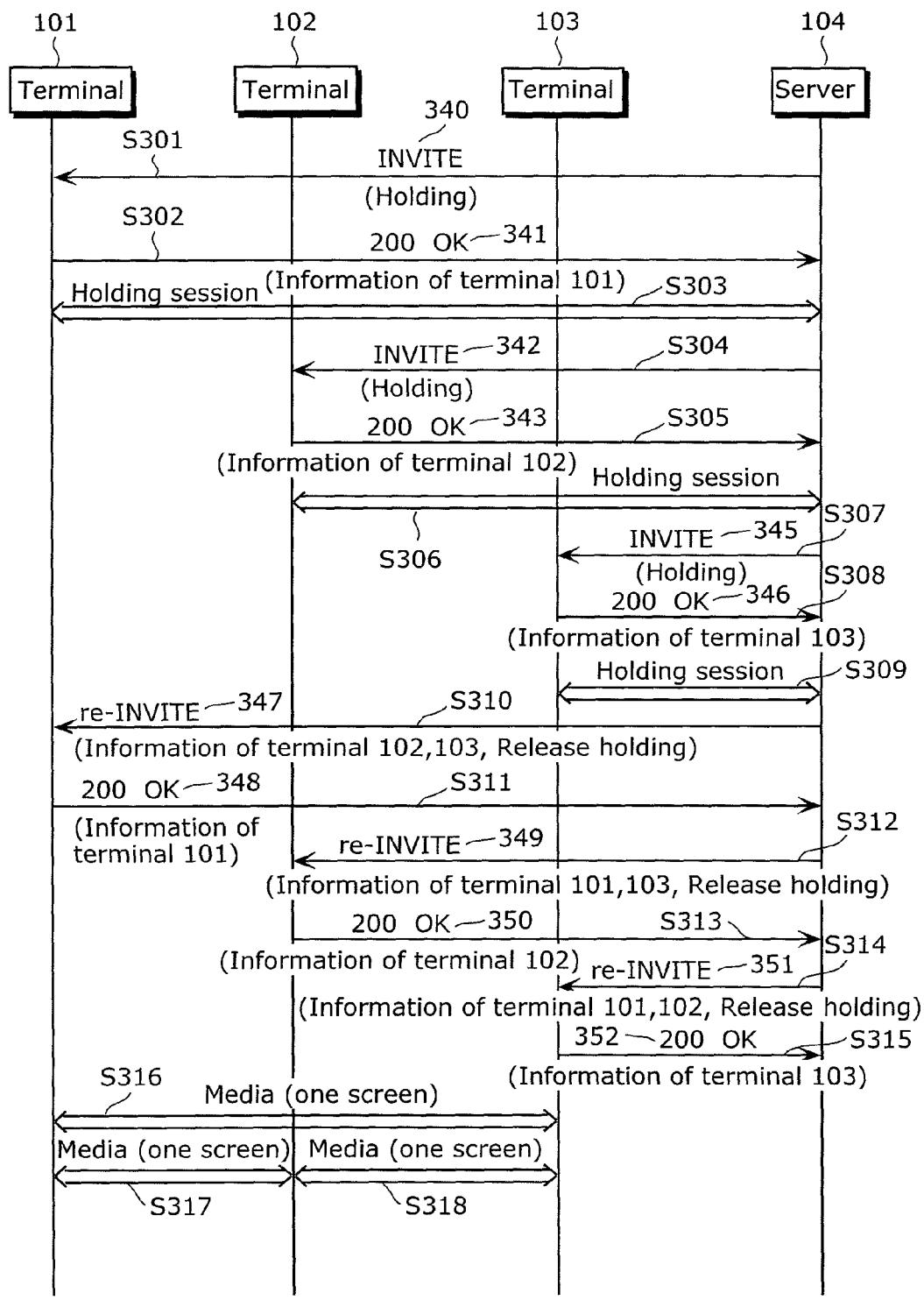
FIG. 20 is a sequence diagram illustrating the process flow in the video conference system according to Embodiment 3 of the present invention.

The structure of the video conference system 100 according to Embodiment 3 is similar to the structure illustrated in FIG. 1. Accordingly, the description is omitted. In addition, the structure of the server 104 according to Embodiment 3 is similar to the structure illustrated in FIG. 2. Accordingly, the description is omitted FIG. 20 is a sequence diagram illustrating the process flow in the video conference system 100 according to Embodiment 3. FIG. 20 also illustrates the process flow for a video conference among the terminals 101 to 103, triggered by the origination from the server 104. Note that, in FIG. 20, ACK, REFER response, NOTIFY, NOTIFY response, and others are omitted.

The server 104 first transmits INVITE 340 to the terminal 101 (S301). INVITE 340 further includes a hold releasing request 404. For example, INVITE 340 includes the IP address 401, the receiving port number 402, the available codec 403, and the hold request 404 similar to the 200 response 301 illustrated in FIG. 5.

The terminal 101 which received INVITE 340 transmits the 200 response 341 including the media information of the terminal 101 to the server 104 (S302).

Furthermore, the terminal 101 becomes on hold in response to the hold request 404 included in INVITE 340 (S303).

The server 104 then transmits INVITE 342 including the hold request 404 to the terminal 102 (S304). This INVITE 342 is, for example, a message similar to INVITE 340.

The terminal 102 which received INVITE 342 transmits the 200 response 343 including the media information of the terminal 102 to the server 104 (S305).

Furthermore, the terminal 102 becomes on hold in response to the hold request 404 included in INVITE 342 (S306).

The server 104 then transmits INVITE 345 including the hold request 404 to the terminal 103 (S307). This INVITE 345 is, for example, a message similar to INVITE 340.

The terminal 103 which received INVITE 345 transmits the 200 response 346 including the media information of the terminal 103 to the server 104 (S308).

Furthermore, the terminal 103 becomes on hold in response to the hold request 404 included in INVITE 345 (S309).

Next, the server 104 transmits re-INVITE 347 to the terminal 101 (S310). Re-INVITE 347 includes the media information of the terminals 102 and 103, and the hold releasing request 406.

The terminal 101 which received re-INVITE 347 transmits the 200 response 348 including the media information of the terminal 101 to the server 104 (S311).

Next, the server 104 transmits re-INVITE 349 to the terminal 102 (S312). Re-INVITE 349 includes the media information of the terminals 101 and 103, and the hold releasing request 406.

The terminal 102 which received re-INVITE 349 transmits the 200 response 350 including the media information of the terminal 102 to the server 104 (S313).

Next, the server 104 transmits re-INVITE 351 to the terminal 103 (S314). Re-INVITE 351 includes the media information of the terminals 101 and 102, and the hold releasing request 406.

The terminal 103 which received re-INVITE 351 transmits the 200 response 352 including the media information of the terminal 103 to the server 104 (S315).

As such, a connection for directly transmitting/receiving the media data is established between the terminals 101 and 103 (S316). In addition, a connection for directly transmitting/receiving the media data is established between the terminals 101 and 102 (S317). In addition, a connection for directly transmitting/receiving the media data is established between the terminals 102 and 103 (S318). Thus, a multipoint video conference in which media data is directly transmitted/received can be organized among the terminals 101 and 103.

The following specifically describes the operations of the server 104 according to Embodiment 3.

Figure 21:
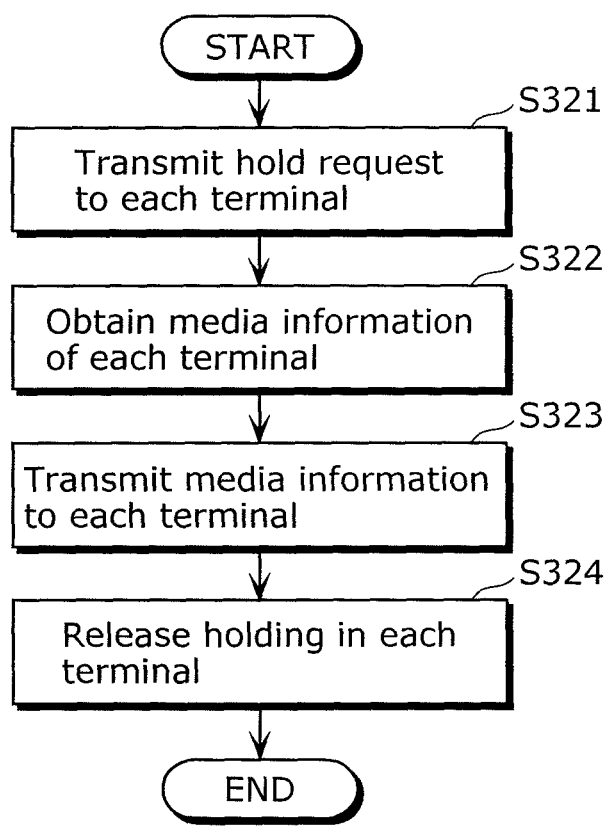
FIG. 21 is a flowchart illustrating the process flow of the server according to Embodiment 3 of the present invention.

FIG. 21 is a flowchart illustrating the process flow of the server 104 for organizing a video conference among the terminals 101 to 103.

The holding unit 204 first generates INVITE 340, 342, and 345 including the hold request 404. The holding unit 204 then transmits INVITE 340, 342, and 345 to all of the terminals 101, 102, and 103 participating in the conference, respectively (S321).

The callee information obtaining unit 203 receives 200 responses 341, 343, and 346 in response to INVITE 340, 342, and 345, respectively. The callee information obtaining unit 203 then obtains the media information of the terminals 101 to 103 included in the 200 responses 341, 343, and 346 (S322).

The callee information obtaining unit 203 passes the obtained media information of the terminals 101 to 103 to the control unit 201. The control unit 201 then stores the received media information of the terminals 101 to 103 to the terminal information holding unit 206.

The control unit 201 also passes the media information of the terminals 101 to 103 to the communication starting unit 205. The communication starting unit 205 generates re-INVITE 347, 349, and 351 including the media information of the terminals 101 to 103. The communication starting unit 205 then transmits re-INVITE 347, 349, and 351 to the terminals 101 to 103, respectively (S323). The server 104 receives the 200 responses 348, 350, and 352 from the terminals 101 to 103.

As such, the video conference connection among the three parties; namely, the terminals 101, 102, and 103 is established.

As such, in the video conference system 100 according to Embodiment 3 of the present invention, the server 104 transmits an originating message including the hold request 404 to the terminals 101 to 103. The terminals 101 to 103 return a response including the media information to the server 104. Subsequently, the server 104 transmits a hold releasing message including the media information of the communicating terminal to the terminals 101 to 103.

With this, the video conference system 100 according to Embodiment 3 of the present invention establishes a video conference communication in which the terminals directly transmit and receive the media data by an origination from the server 104. For example, the server 104 can implement a reserved terminal by registering a conference time and participants, and automatically starts the conference at the registered time. Therefore, the video conference system 100 according to Embodiment 3 of the present invention can improve the convenience for the user.

Embodiment 4

The server 104 of the video conference system 100 according to Embodiment 4 holds the transmission and reception of the media data only to/from the terminals whose media information is not obtained. Note that, the server 104 does not hold the transmission/reception to/from the terminals whose media information has already been obtained. In addition, the server 104 releases the holding for transmission/reception of the media data to/from the terminals whose media information has already been obtained, and continues the holding for transmission/reception of the media data to/from the terminals whose media information has not been obtained yet.

The structure of the video conference system 100 according to Embodiment 4 is similar to the structure illustrated in FIG. 1. Accordingly, the description is omitted. In addition, the structure of the server 104 according to Embodiment 4 is similar to the structure illustrated in FIG. 2. Accordingly, the description is omitted.

Figure 22:
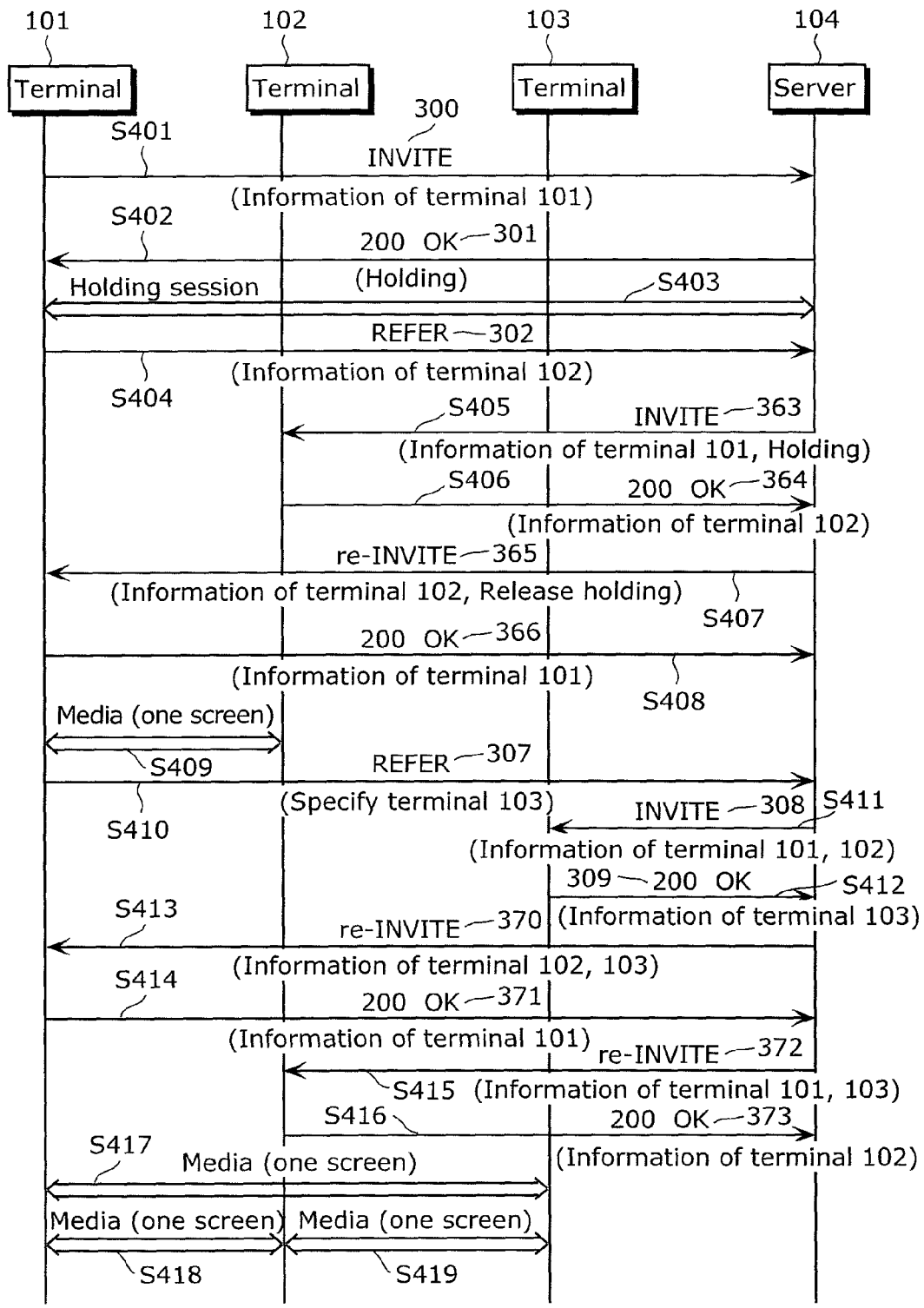
FIG. 22 is a sequence diagram illustrating the process flow in the video conference system according to Embodiment 4 of the present invention.

FIG. 22 is a sequence diagram illustrating the process flow in the video conference system 100 according to Embodiment 4. FIG. 22 further illustrates the process flow for a video conference among the terminals 101 to 103 organized by the terminal 101 (caller). Note that, the reference numerals same as FIG. 3 are assigned to the components similar to the components in FIG. 3. Thus, descriptions for these components are omitted, and only the difference is described. Note that, in FIG. 22, ACK, REFER response, NOTIFY, NOTIFY response, and others are omitted.

The process in steps S401 to S404 illustrated in FIG. 22 corresponds to the process in step S101 to S104 illustrated in FIG. 3, respectively. Accordingly, the description for the process is omitted.

After step S404, the server 104 transmits INVITE 363 including the media information of the terminal 101 to the terminal 102 (S405).

Figure 23:
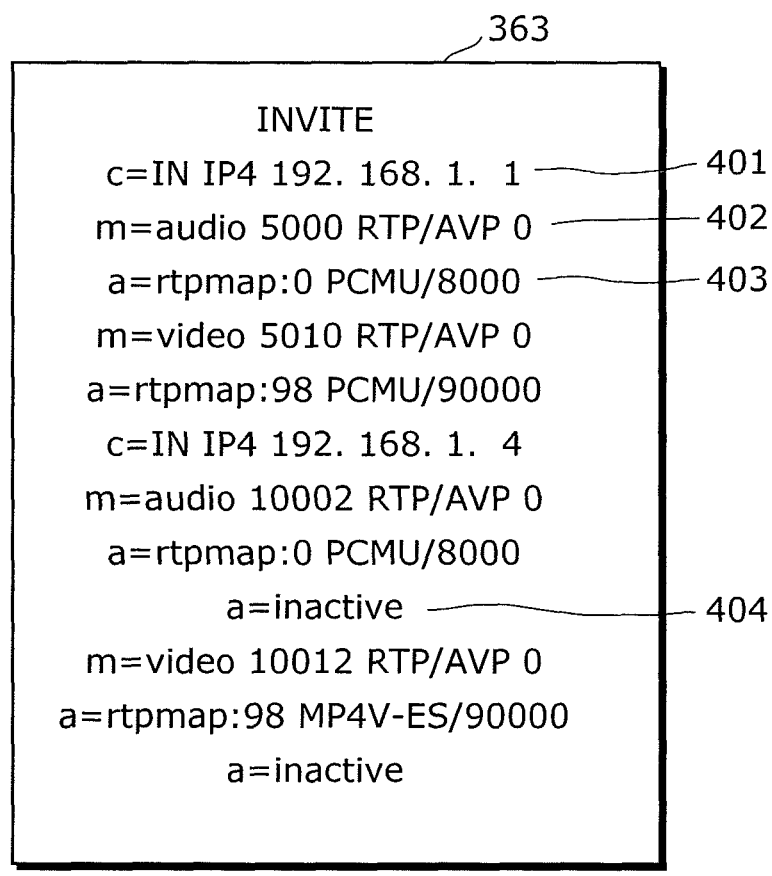
FIG. 23 illustrates the structure of INVITE according to Embodiment 4 of the present invention.

FIG. 23 illustrates the configuration of INVITE 363. One of the two types of media information included in INVITE 363 is the media information of the terminal 101, and the other includes the hold request 404.

When INVITE 363 is received, the terminal 102 transmits the 200 response 364 including the media information of the terminal 102 (S406).

Figure 24:
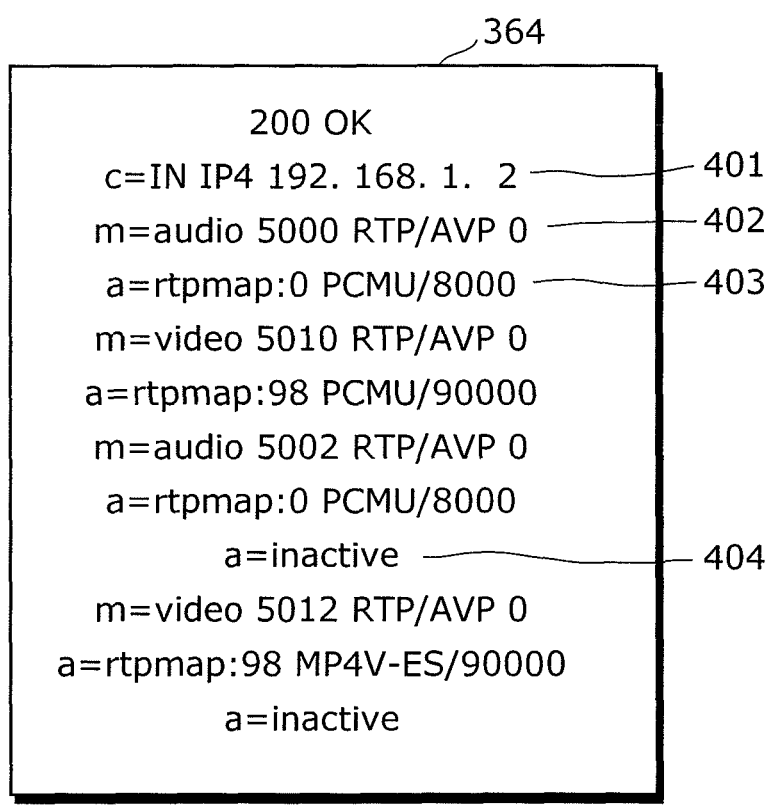
FIG. 24 illustrates the structure of a 200 response according to Embodiment 4 of the present invention.

FIG. 24 illustrates the configuration of the 200 response 364. One of the two types of media information included in the 200 response 364 is the media information of the terminal 102, and the other includes the hold request 404.

When the 200 response 364 is received, the server 104 transmits ACK to the terminal 102.

The terminal 102 starts transmitting/receiving the media data to/from the terminal 101 which does not include the hold request 404, among two types of communications available for the terminal 102. More specifically, the terminal 102 starts transmitting the media data to the IP address 401 and the receiving port number 402 included in the media information of the terminal 101. Furthermore, the terminal 102 simultaneously starts preparing for the reception of the media data to the IP address 401 and the receiving port number 402 described in the media information of the terminal 102. The terminal also holds a communication including the hold request 404, among the two types of communications available for the terminal 102.

The server 104 transmits NOTIFY for notifying that the invitation is completed to the terminal 101, after transmitting ACK. The terminal 101 transmits a 200 response in response to NOTIFY to the server 104.

Next, the server 104 generates re-INVITE 365 including the media information of the terminal 102, and transmits the generated re-INVITE 365 to the terminal 101 (S407).

FIG. 25 illustrates the configuration of re-INVITE 365.

As illustrated in FIG. 25, one of the two types of media information included in re-INVITE 365 is the media information of the terminal 102 and includes the hold releasing request 406. The other includes the hold request 404.

The terminal 101 which received re-INVITE 365 transmits the 200 response 366 including the media information of the terminal 101 to the server 104 (S408).

Figure 26:
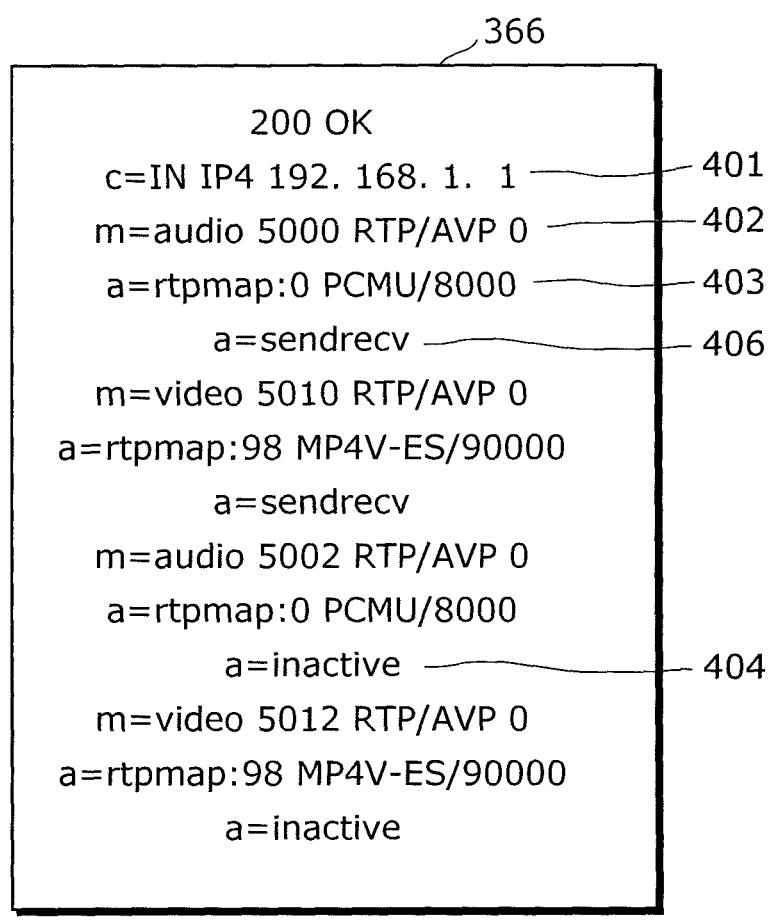
FIG. 26 illustrates the structure of a 200 response according to Embodiment 4 of the present invention.

FIG. 26 illustrates the configuration of the 200 response 366. One of the two types of media information included in the 200 response 366 is the media information of the terminal 101, and the other includes the hold releasing request 406. The other includes the hold request 404.

The terminal 101 starts transmitting/receiving the media data among the terminal 102 including the hold releasing request 406, among two types of communications available for the terminal 101. More specifically, the terminal 101 starts transmitting the media data to the IP address 401 and the receiving port number 402 included in the media information of the terminal 102. Furthermore, the terminal 101 simultaneously starts preparing the reception of the media data to the IP address 401 and the receiving port number 402 described in the media information of the terminal 101. In addition, the terminal 101 continues to hold the communication which does not include the hold releasing request 406, among the two types of communications available for the terminal 101.

The server 104 transmits ACK in response to the 200 response 306 to the terminal 101.

As such, a connection for directly transmitting/receiving the media data is established between the terminals 101 and 102 (S109). Here, the video transmitted from the terminal 102 is displayed on the monitor 121 of the terminal 101, and the video transmitted from the terminal 101 is displayed on the monitor 122 of the terminal 102. Furthermore, the monitor 131 of the terminal 101 and the monitor 132 of the terminal 102 are not used and are on hold.

Next, steps S410 to S412 are performed. The process in steps S410 to S412 is similar to the process in steps S110 to S112 illustrated in FIG. 3. Accordingly, the description for the process is omitted.

Next, the server 104 transmits re-INVITE 370 for changing the destination of the media data to the terminal 101 (S413). Re-INVITE 370 includes the media information of the terminals 102 and 103. Re-INVITE 370 further includes the hold releasing request 406 in response to the transmission/reception of the media data to/from the terminal 103.

The terminal 101 which received re-INVITE 370 transmits the 200 response 371 including the media information of the terminal 101 to the server 104 (S414). When the 200 response 371 is received, the server 104 transmits ACK to the terminal 101.

Next, the server 104 transmits re-INVITE 372 for changing the destination of the media data to the terminal 102 (S415). Re-INVITE 372 includes the media information of the terminals 101 to 103. Re-INVITE 372 further includes the hold releasing request 406 in response to the transmission/reception of the media data to/from the terminal 103.

The terminal 102 which received re-INVITE 372 transmits the 200 response 373 including the media information of the terminal 101 to the server 104 (S416). When the 200 response 373 is received, the server 104 transmits ACK to the terminal 102.

As such, a connection for directly transmitting/receiving the media data is established between the terminals 101 and 103 (S417). In addition, a connection for directly transmitting/receiving the media data is established between the terminals 101 and 102 (S418). In addition, a connection for directly transmitting/receiving the media data is established between the terminals 102 and 103 (S419). Thus, a multipoint video conference in which media data is directly transmitted/received can be organized among the terminals 101 to 103.

Furthermore, the monitors 121 and 131 in the terminal 101 displays the video transmitted form the terminals 102 and 103, respectively. Furthermore, the monitors 122 and 132 in the terminal 102 display the video transmitted from the terminals 101 and 103, respectively. Furthermore, the monitors 123 and 133 in the terminal 103 display the video transmitted from the terminals 101 and 102, respectively.

The following specifically describes the operations of the server 104 according to Embodiment 4.

The following description concerns the operation of the server 104 establishing a video conference connection between the two terminals 101 and 102.

Note that, the description for the operations similar to the operations of the server 104 according to Embodiment 1 is omitted, and only the differences shall be described.

Figure 27:
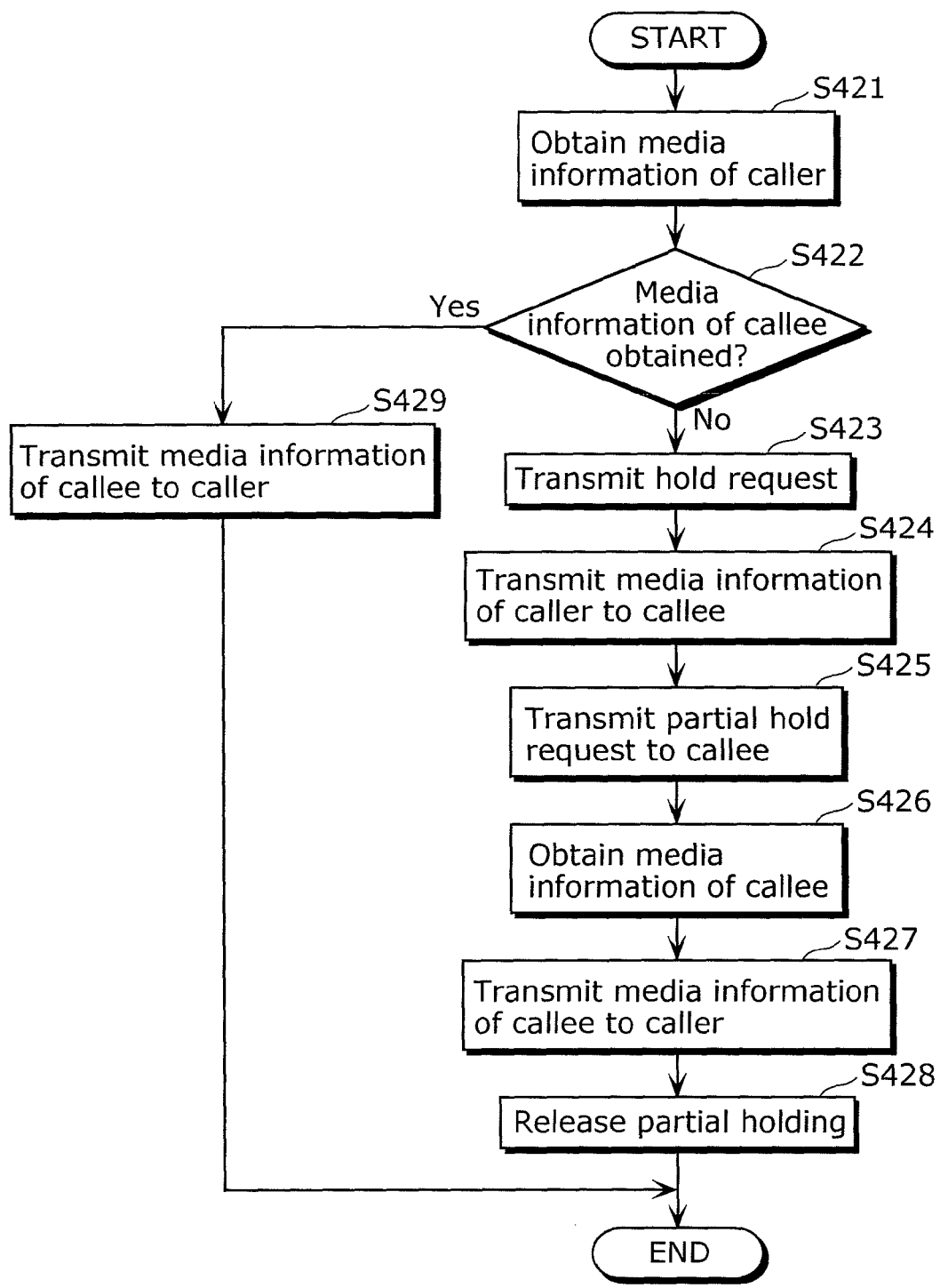
FIG. 27 is a flowchart illustrating the process flow of the server according to Embodiment 4 of the present invention.

FIG. 27 is a flowchart illustrating the process flow of the server 104 for organizing the video conference between the two terminals 101 and 102. Note that, in FIG. 27, REFER response, NOTIFY, NOTIFY response, and ACK are omitted for the simplicity of description.

The process in steps S421 to S424, S426 to S427, and S429 is similar to the process in steps S121 to 124, S125 to 126, and S128. Accordingly, the detailed description is omitted.

The server 104 transmits, to the terminal 102 which is the callee terminal, a message including a hold request 404 for holding the communication with the terminal 103 whose media information has not obtained by the server 104, at the same time as step S423. The callee information obtaining unit 203 transmits INVITE 363 to the terminal 102 and thereby transmitting the media information of the terminal 101 which is the caller terminal (S424), and transmitting the hold request (S425).

More specifically, the control unit 201 obtains the media information of the terminal 101 to be stored in the terminal information holding unit 206. The control unit 201 then passes the obtained media information of the terminal 101 to the callee information obtaining unit 203. The callee information obtaining unit 203 then generates INVITE 363 including two types of media information, and transmits the generated INVITE 363 to the terminal 102. One of the two types of media information included in INVITE 363 is the media information of the terminal 101, and the other includes the hold request 404. With this, one of the two types of communications available to the terminal 102 becomes on hold. Furthermore, among the two types of communications available to the terminal 102, communication with the terminal 101 whose media information is obtained by the server 104 starts.

After step S426, the communication starting unit 205 transmits the media information of the terminal 102 to the terminal 101 (S427). Furthermore, the communication starting unit 205 releases the holding status of the terminal 101 (S428). More specifically, the communication starting unit 205 releases the hold between the terminal 101 and the terminal 102 whose media information is obtained, and continues to hold the communication between the terminal 101 and the terminal 103 whose media information is not obtained.

More specifically, the communication starting unit 205 generates re-INVITE 365 including the media information of the terminal 102 and the hold releasing request 406, and transmits the generated re-INVITE 365 to the terminal. One of the two types of media information included in re-INVITE 365 is the media information of the terminal 102, and the other includes the hold request 406. The other includes the hold request 404. With this, the hold in the communication between the terminal 101 and the terminal 102 is released, the hold in the other communication continues, among the two types of communications available for the terminal 101.

Subsequently, the server 104 receives the 200 response 366 from the terminal 101.

With the processes described above, the communication between the terminals 101 and 102 starts through the mutual transmission of the media information of the terminals 101 and 102. In addition, the communication between the terminal 101 and the terminal 103, and the communication between the terminal 102 and the terminal 103 become on hold.

Note that, while maintaining the video conference connection between the terminals 101 and 102 by the server 104 according to Embodiment 4, a three-party video conference connection adding the terminal 103 is established. The operation for this process is similar to the process by the server 104 according to Embodiment 1, and thus detailed description is omitted.

The server 104 of the video conference system 100 according to Embodiment 4 holds the transmission and reception of the media data to/from the terminals whose media information is not obtained. Note that, the server 104 does not hold the transmission/reception to/from the terminals whose media information has already been obtained. In addition, the server 104 releases the holding for transmission/reception of the media data to/from the terminals whose media information has already been obtained only, and continues to hold the transmission/reception of the media data to/from the terminals whose media information has not been obtained yet.

With this, in the video conference system 100 according to Embodiment 4, the terminals which can transmit/receive multiple pieces of media data can communicate with the terminals to which a connection is established, using one piece of media data only. Therefore, the video conference system 100 according to Embodiment 4 of the present invention can improve the convenience for the user.

Embodiment 5

The video conference system 100 according to Embodiment 5 uses a 180 response specifying the calling status, instead of the hold request 404.

The structure of the video conference system 100 according to Embodiment 5 is similar to the structure illustrated in FIG. 1. Accordingly, the description is omitted.

Figure 28:
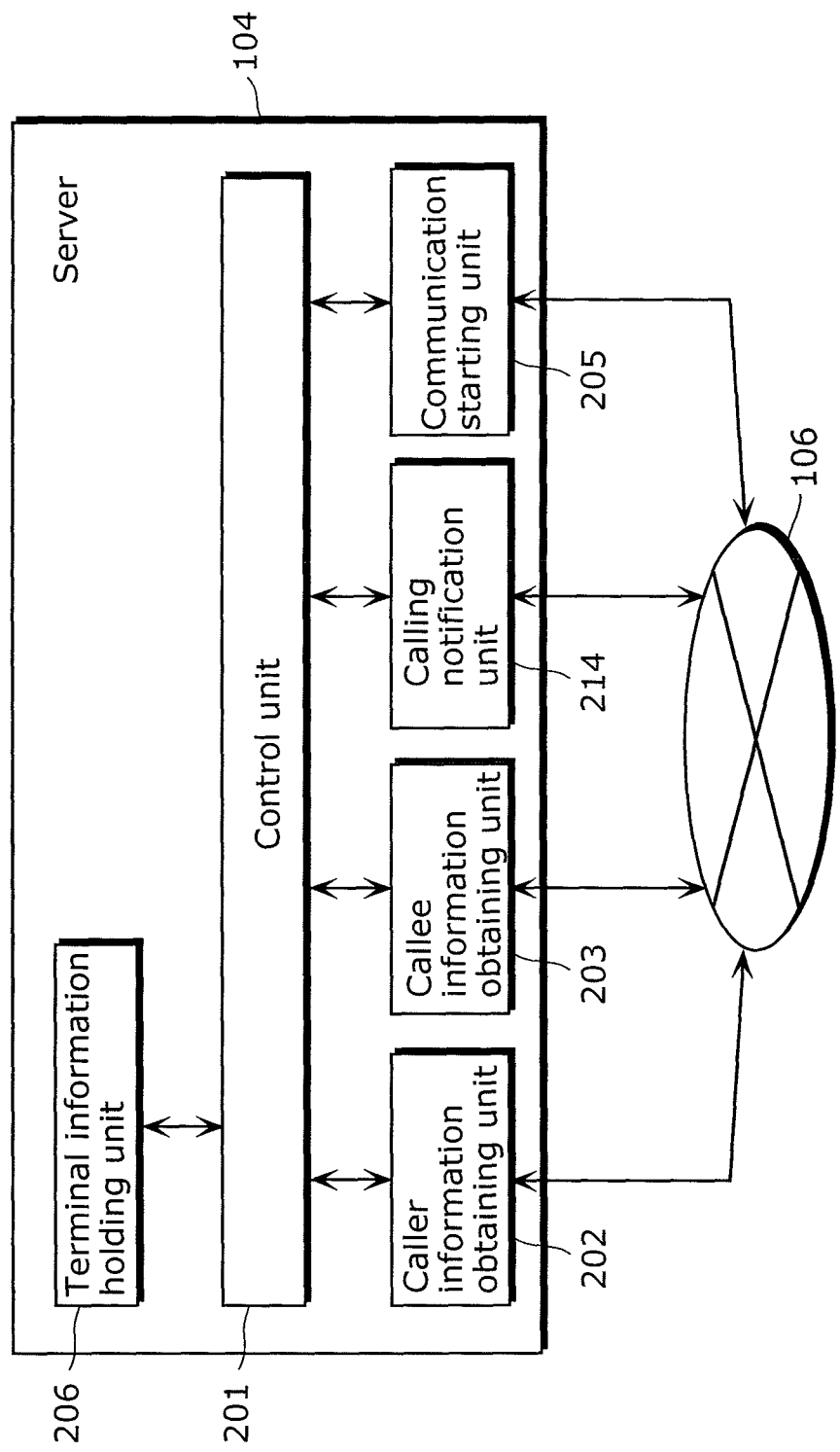
FIG. 28 illustrates the structure of the server according to Embodiment 5 of the present invention.

FIG. 28 illustrates the structure of the server 104 according to Embodiment 5 of the present invention.

The server 104 illustrated in FIG. 28 includes a control unit 201, a caller information obtaining unit 202, a callee information obtaining unit 203, a calling notification unit 214, a communication starting unit 205, and a terminal information holding unit 206. Note that, the reference numerals same as FIG. 2 are assigned to the components similar to the components in FIG. 2.

The calling notification unit 214 generates 180 response (180 Ringing), and transmits the generated 180 response to the caller terminal. The 180 response is a message that indicates the calling status. In other words, 180 response is an instruction for preventing the starting the transmission of the media data of the callee terminals 101 to 103 to the terminals 101 to 103. More specifically, the calling notification unit 214 transmits a 180 response to the caller terminal when the callee information obtaining unit 203 has not obtained the media information of the callee terminal yet.

The following describes the operations of the video conference system 100 according to Embodiment 5 of the present invention.

Figure 29:
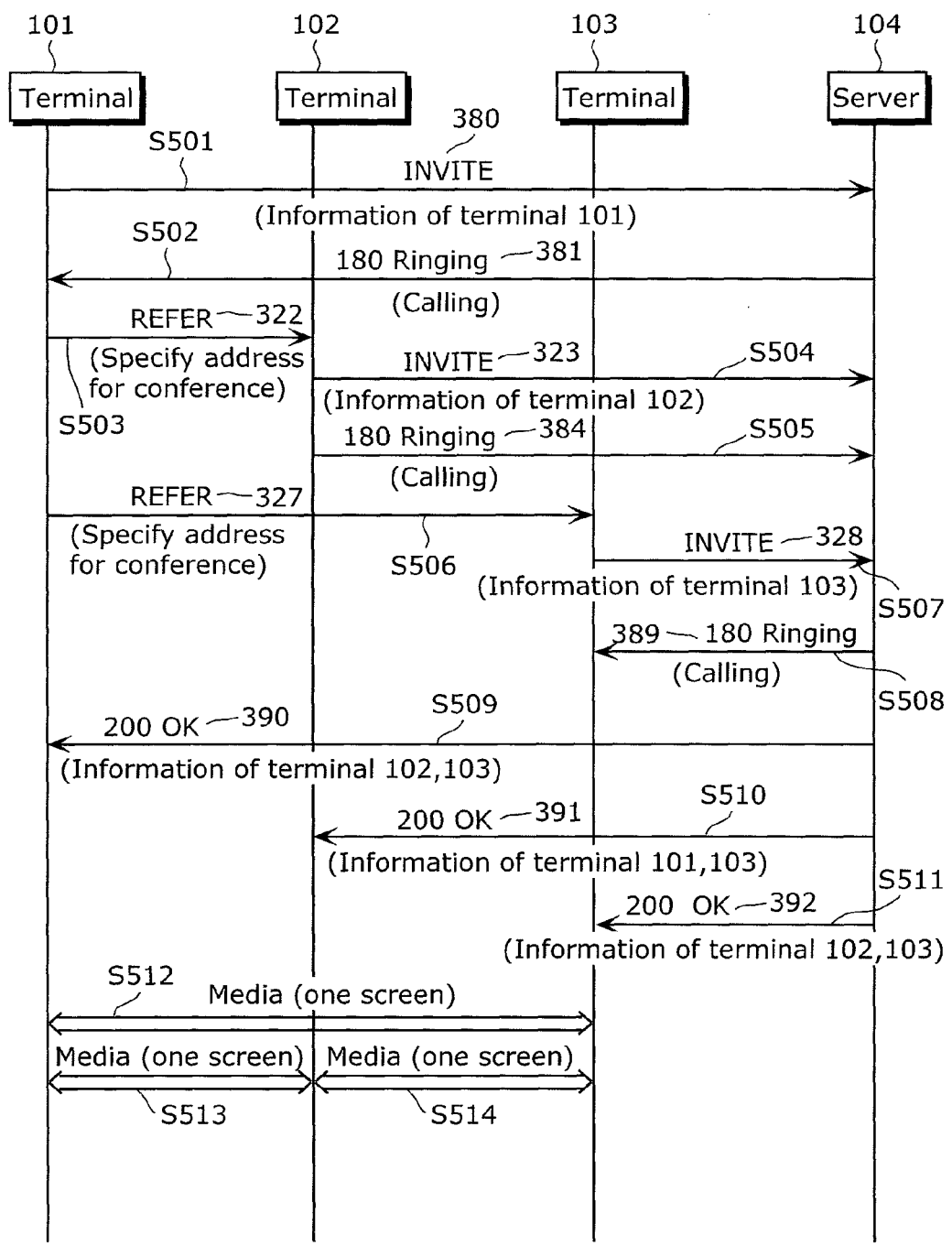
FIG. 29 is a sequence diagram illustrating the process flow in the video conference system according to Embodiment 5 of the present invention.

FIG. 29 is a sequence diagram illustrating the process flow in the video conference system 100 according to Embodiment 5. FIG. 29 further illustrates the process flow for a video conference among the terminals 101 to 103 organized by the terminal 101 (caller). Note that, in FIG. 29, ACK, REFER response, NOTIFY, NOTIFY response, and others are omitted. Furthermore, the components similar to the components in FIG. 16 are assigned with the same reference numerals.

First, the terminal 101 transmits INVITE 380 including the media information of the terminal 101 to the server 104 (S501).

FIG. 30 illustrates the configuration of INVITE 380. INVITE 380 includes the media information of the terminal 101 and the terminal count 407. The terminal count 407 indicates the number of terminals participating in the video conference. Here, three terminals participate in the video conference, and thus a=terminal: 3 is described.

Note that, although the terminal count 407 is described in ling "a=" of SDP, the terminal count 407 may be described in an SIP extension header. Furthermore, the server 104 may determine the number of terminals participating in the video conference in advance.

The server 104 that received INVITE 380 transmits a 180 response 381 to INVITE 380 (S502). The 180 response is a message indicating that the caller terminal is ringing.

The terminal 101 then transmits REFER 322 describing a conference URI on the Refer-To header 405 for inviting the terminal 102 to the conference (S503).

The terminal 102 which received REFER 322 transmits INVITE 323 including the media information of the terminal 102 to the server 104 (S504).

The server 104 received INVITE 323 transmits 180 response 384 to the terminal 102 (S505).

The terminal 101 then transmits REFER 327 describing a conference URI on Refer-To header 405 to the terminal 103 for inviting the terminal 103 to the conference (S506).

The terminal 103 that received REFER 327 transmits INVITE 328 including the media information of the terminal 103 to the server 104 (S507).

The server 104 that received INVITE 328 transmits 180 response 389 to the terminal 103 (S508).

The server 104 counts the number of terminals that received INVITE every time INVITE transmitted from a terminal is received. The server 104 returns 200 response to the terminals 101 to 103 when the terminal count matches the terminal count 407 included in INVITE 380 matches. Here, the terminal count 407 is 3. Thus, the server 104 returns 200 response to terminals 101 to 103 when receiving INVITE 380, 323, and 328 from the terminals 101 to 103.

More specifically, the server 104 transmits 200 response including the media information of the terminals 102 and 103 to the terminal 101 (S509), and transmits 200 response 391 including the media information of the terminals 101 and 103 to the terminal 102 (S510). The server 104 further transmits 200 response 392 including the media information of the terminals 101 and 102 to the terminal 103 (S511).

As such, a connection for directly transmitting/receiving the media data is established between the terminals 101 and 103 (S512). In addition, a connection for directly transmitting/receiving the media data is established between the terminals 101 and 102 (S513). Furthermore, a connection for directly transmitting/receiving the media data is established between the terminals 102 and 103 (S514). Thus, a multipoint video conference in which media data is directly transmitted/received can be organized among the terminals 101 and 103.

The following specifically describes the operations of the server 104 according to Embodiment 5.

Figure 31:
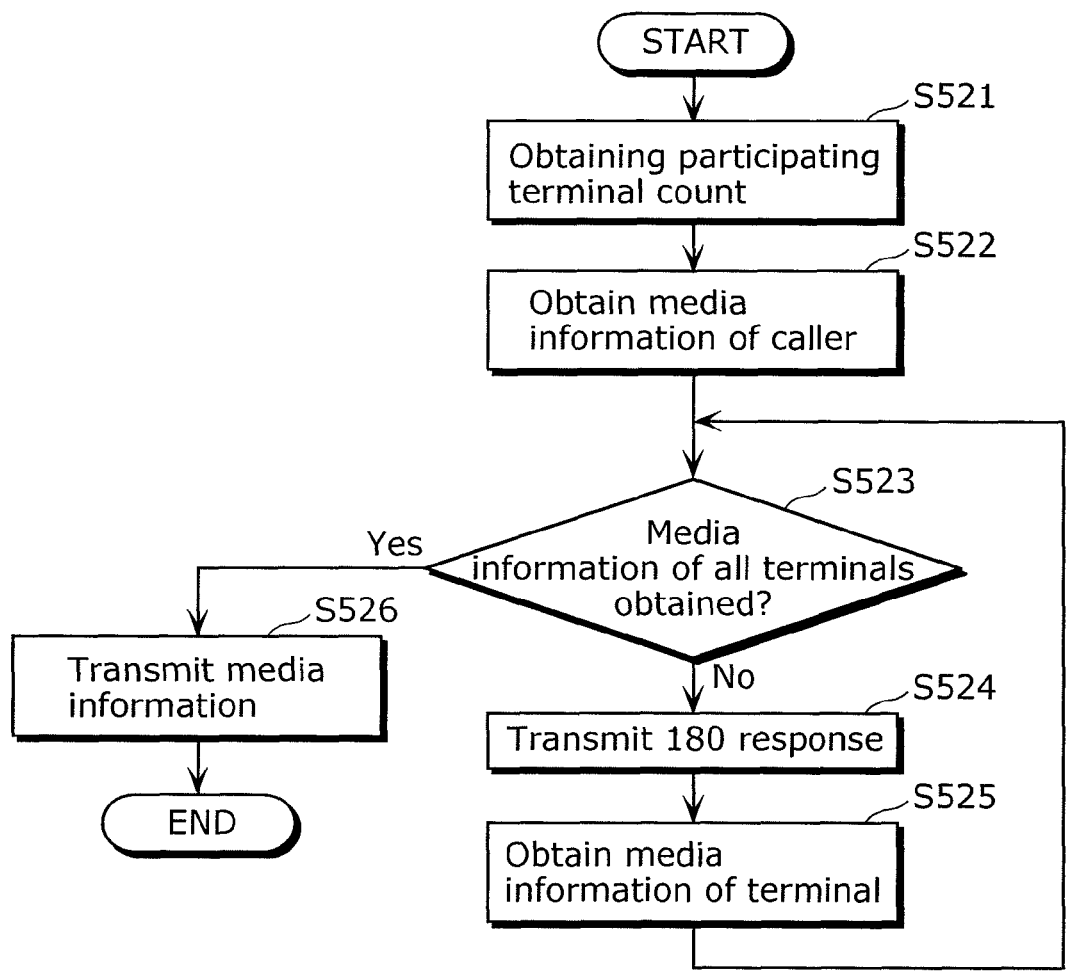
FIG. 31 is a flowchart illustrating the process flow of the server according to Embodiment 5 of the present invention.
Figure 32:
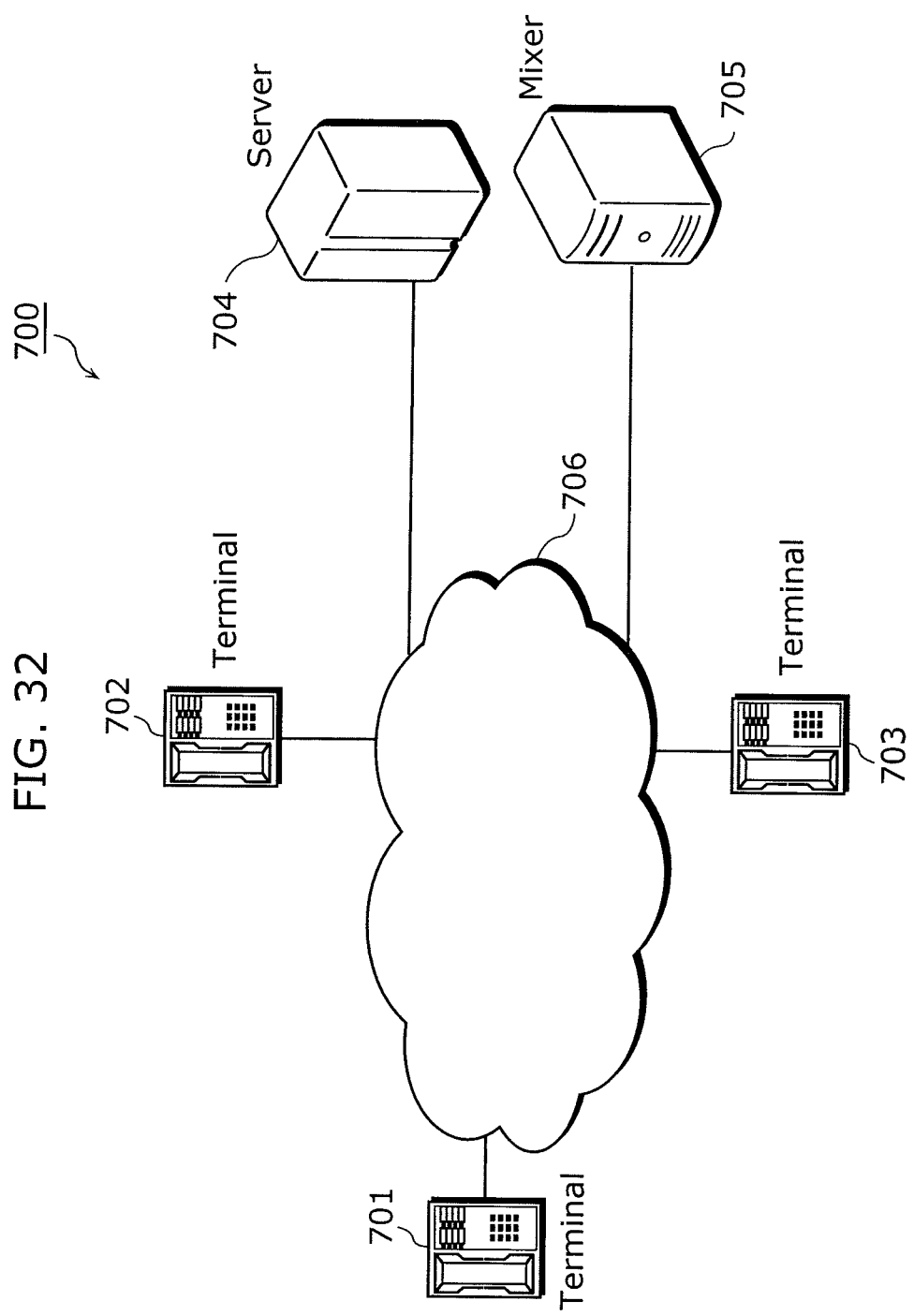
FIG. 32 illustrates the structure of the conventional conference call system.
Figure 33:
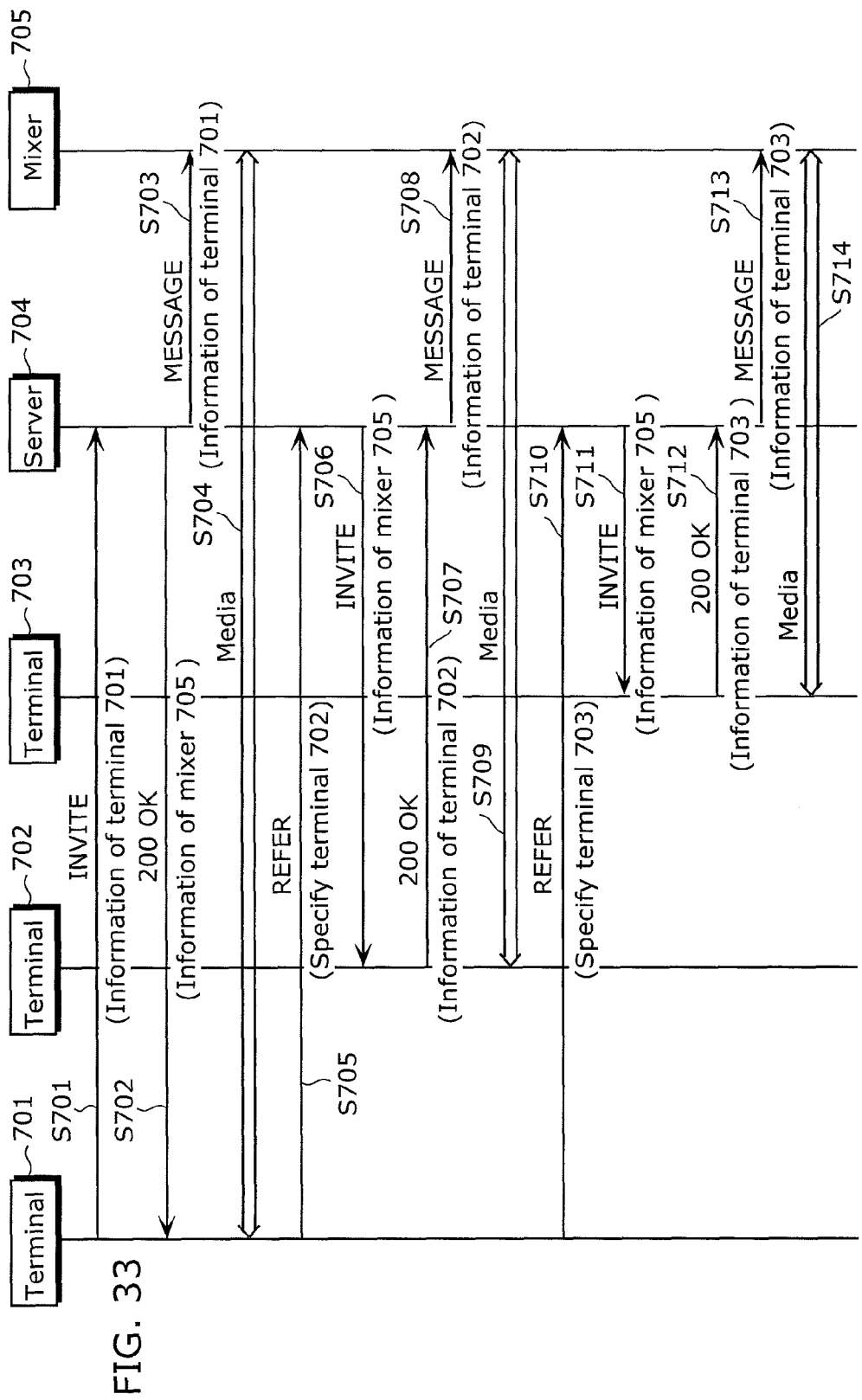
FIG. 33 is a sequence diagram illustrating the structure of the conventional conference call system.
Figure 34:
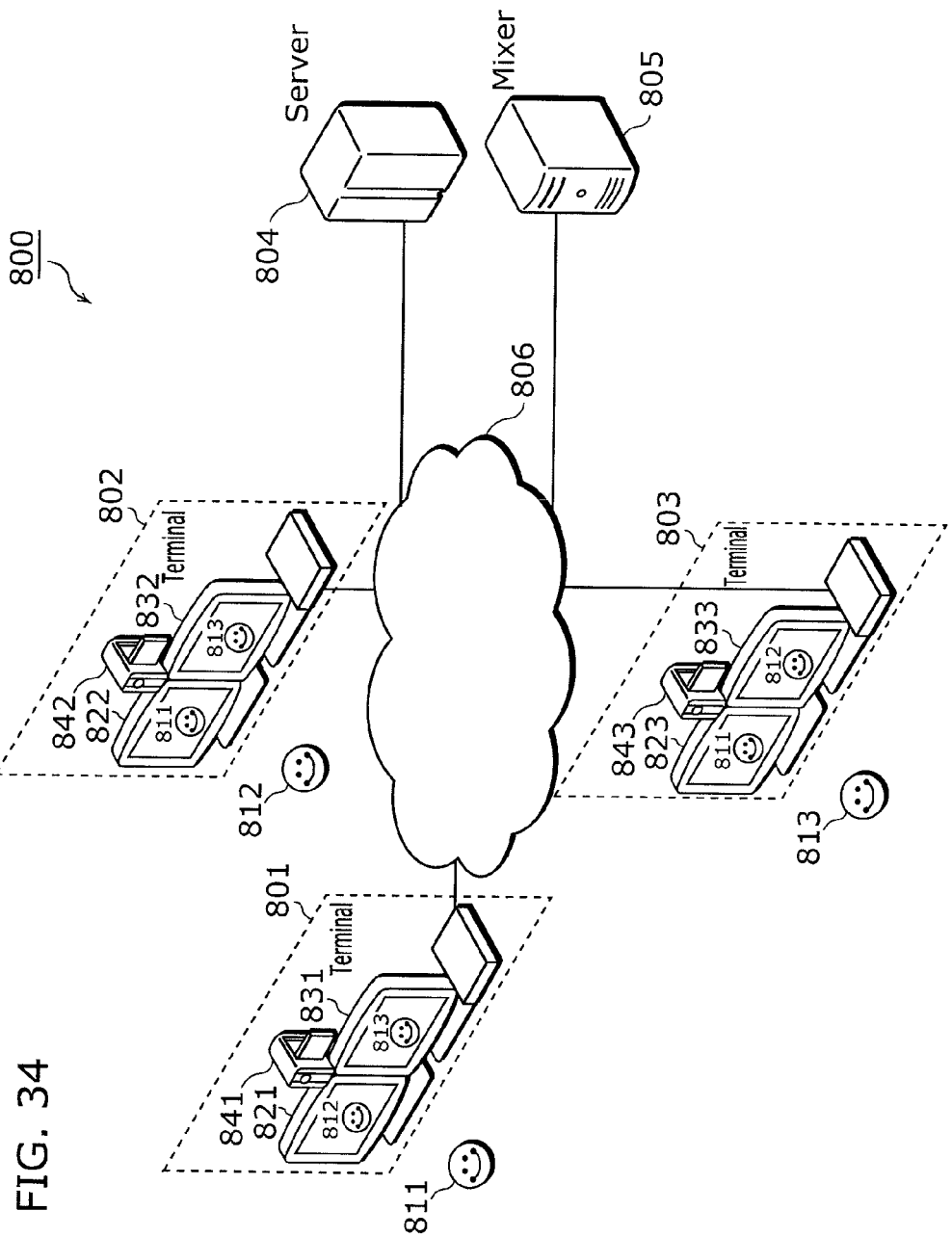
FIG. 34 illustrates the structure of the conventional video conference system.
Figure 35:
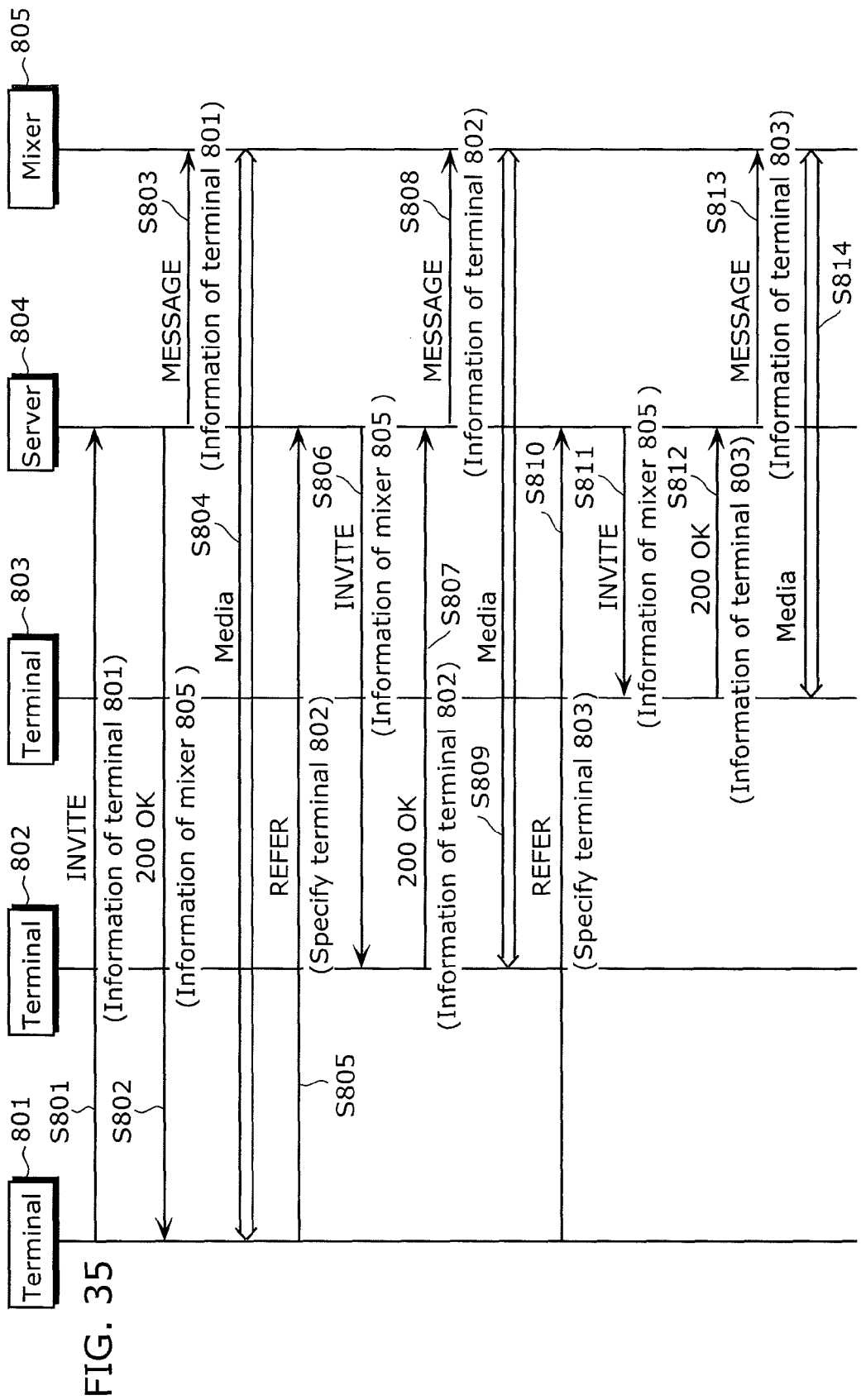
FIG. 35 is a sequence diagram illustrating the process flow of the conventional video conference system.
Figure 36:
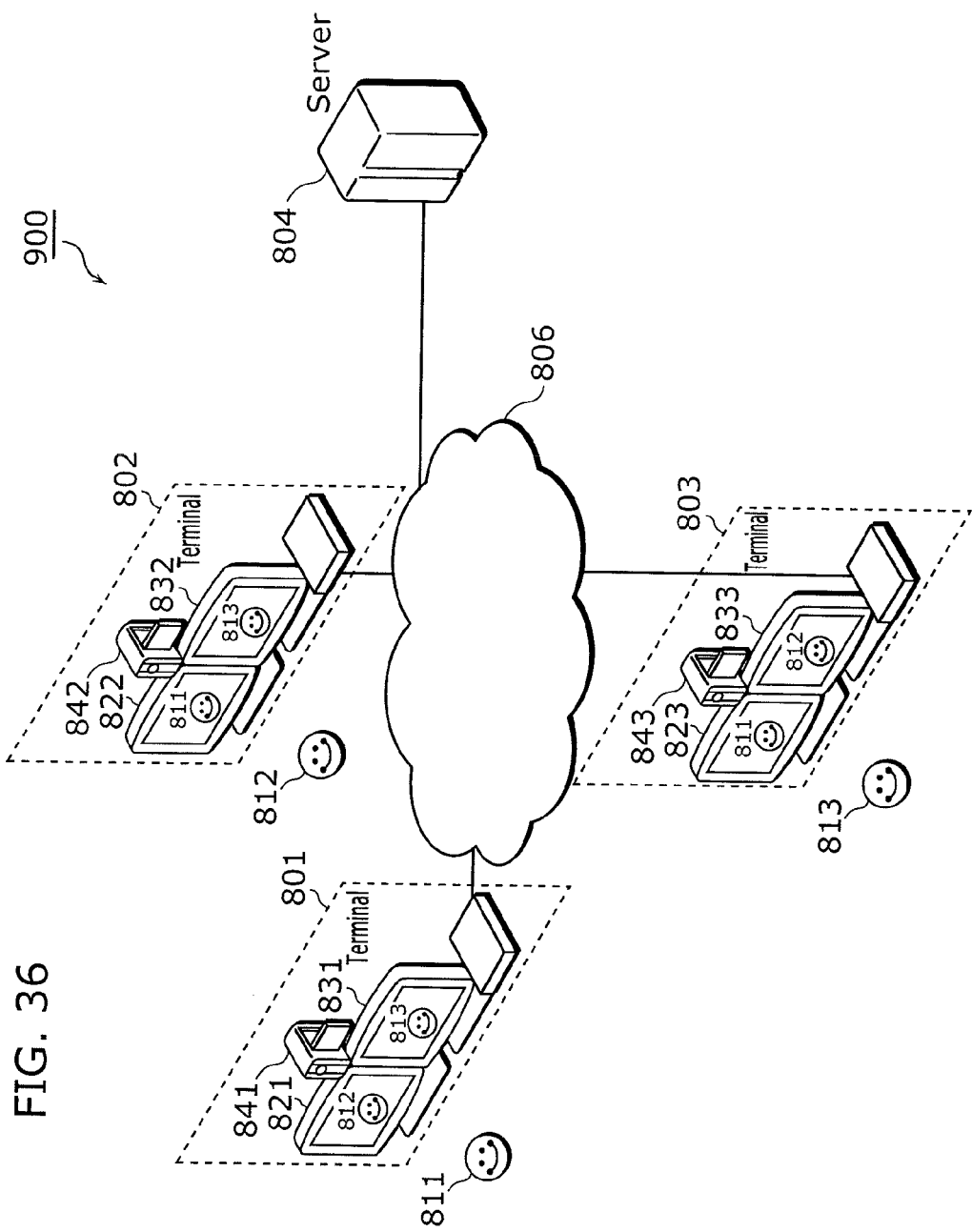
FIG. 36 illustrates the structure of the conventional video conference system.
Figure 37:
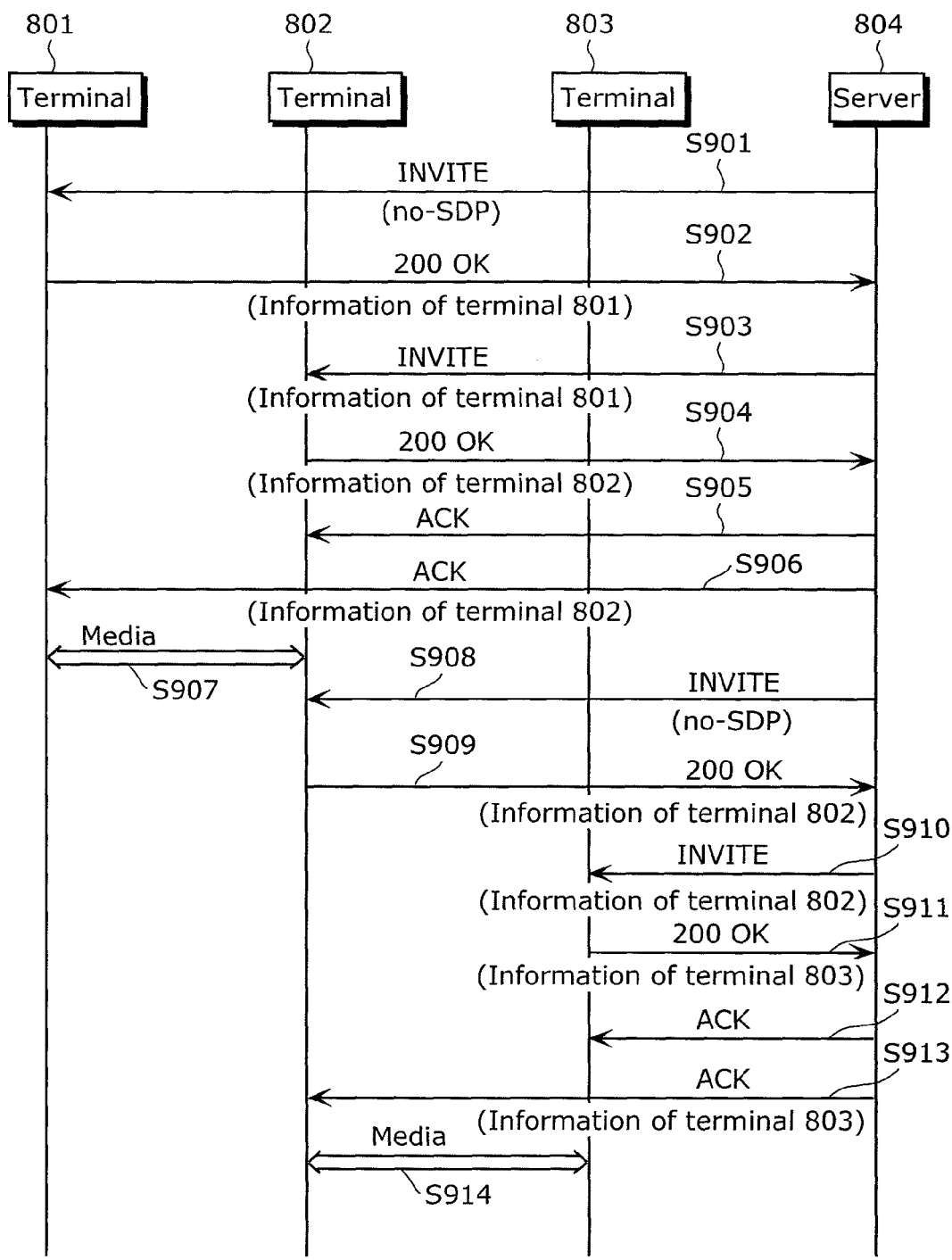
FIG. 37 is a sequence diagram illustrating the process flow of the conventional video conference system without a mixer.

FIG. 31 is a flowchart illustrating the process flow of the server 104 according to Embodiment 5 for organizing a video conference among the three terminals 101 to 103. Note that, in FIG. 31, REFER response, NOTIFY, NOTIFY response, ACK, and others are omitted for the simplicity of description.

The caller information obtaining unit 202 receives INVITE 380 transmitted by the terminal 101, the callee terminal. The caller information obtaining unit 202 then obtains the terminal count 407 participating a video conference included in INVITE 380 (S521). The caller information obtaining unit 202 obtains the media information of the terminal 101 included in INVITE 380 (S522).

The caller information obtaining unit 202 then passes the obtained terminal count 407 and the media information of the terminal 101 to the control unit 201. The control unit 201 then stores the received terminal count 407 and the media information of the terminal 101 to the terminal information holding unit 206.

The control unit 201 then searches for the terminal information holding unit 206, and determines whether or not the media information of all of the terminal 101 to 103 participating the video conference is obtained (S523). More specifically, the control unit 201 compares the terminal count 407 to the number of media information stored in the terminal information holding unit 206. The control unit 201 further determines that the media information of all of the terminals 101 to 103 participating in the video conference is obtained when the terminal count 407 matches the number of media information stored in the terminal information holding unit 206. The control unit 201 determines that the media information of all of the terminals 101 to 103 participating in the conference is not obtained when the terminal count 407 does not match the number of media information stored in the terminal information holding unit 206.

When the media information of all of the terminals 101 to 103 participating the video conference is not obtained (No in S523), the calling notification unit 214 transmits 180 response 381 to the terminal 101 whose media information is obtained in step S522 (S524). Note that, although the calling notification unit 214 uses 180 response as the notification for the calling status, any SIP response in the one hundreds may be used. Furthermore, the calling notification unit 214 may notify the calling status using another message.

Next, the callee information obtaining unit 203 receives INVITE 323 from the terminal 102 whose media information is not received. The caller information obtaining unit 203 obtains the media information of the terminals 102 included in INVITE 323 (S525). Subsequently, the callee information obtaining unit 203 passes the obtained media information of the terminal 102 to the control unit 201.

The control unit 201 searches for the terminal information holding unit 206 again, and determines whether or not the media information of all of the terminals 101 to 103 participating in the conference is obtained (S523).

For example, when the media information of the terminal 103 is not obtained (No in S523), the calling notification unit 214 transmits 180 response 384 to the terminal 102 whose media information has been newly obtained in the immediately previous step S525 (S524).

Next, the callee information obtaining unit 203 receives INVITE 328 from the terminal 103 whose media information is not received. The callee information obtaining unit 203 obtains the media information of the terminals 103 included in INVITE 328 (S525). Subsequently, the callee information obtaining unit 203 passes the obtained media information of the terminal 103 to the control unit 201.

When the media information of all of the terminals 101 to 103 participating the conference is obtained (Yes in S523), the control unit 201 passes the media information of all of the terminals 101 to 103 participating the conference to the communication starting unit 205. The communication starting unit 205 transmits 200 responses 390 to 392 including the media information of the callee to all of the terminals 101 to 103 participating in the conference (S526).

As such, transmission/reception of the media data starts among the terminals 101 to 103 participating in the conference.

As described above, in the video conference system 100 according to Embodiment 5, the server 104 returns 180 response when receiving INVITE including the media information. The server 104 further transmits 200 response including the media information of the callee to the terminals 101 to 103, after receiving INVITE including the media information.

With this, in the video conference system 100 according to Embodiment 5, the only additional function necessary for the terminals 101 to 103 is the function for receiving 180 response. Accordingly, the number of terminals connectable to the video conference system 100 increases. This facilitates the construction of the system.

The video conference system according to Embodiments of the present invention has been described above. However, the present invention shall not be limited to Embodiments.

For example, although Embodiments 1 to 5 illustrated examples of the present invention applied to the multipoint video conference. However, the present invention is also applicable to audio conference such as conference calls, and other conference communication.

In addition, Embodiments 1 to 5 illustrated an example of connection by three terminals. The same procedure can also be used for a connection involving four or more terminals.

In addition, although examples of communications using the SIP were illustrated in Embodiments 1 to 5, other protocols such as H.323 and HTTP may be used as a communication protocol.

In addition, in the description for Embodiments 1 to 4, a method using SDP parameters has been described as a method for the hold request and the hold releasing request. However, the hold and the releasing the hold can be performed by other method using SIP extended header, for example.

The present invention may be implemented as a video conference system including all of the functions described in Embodiments 1 to 5, or as a video conference system.

INDUSTRIAL APPLICABILITY

The present invention is applicable to conference systems and connection devices included in conference systems and particularly applicable to a multipoint video conference system and a connection device included in the multipoint video conference system.

The invention claimed is:

1. A connection device which establishes a connection among at least three terminals for a multipoint conference in which media data is directly transmitted without passing through a server and received among the at least three terminals, said connection device comprising:
an information obtaining unit configured to obtain media information related to the transmission and the reception of the media data to and from each of the at least three terminals;
a first message transmitting unit configured to determine whether or not the media information of the each of the at least three terminals is obtained by the information obtaining unit, and to transmit, to any terminal whose media information is obtained, a first message for preventing the any terminal whose media information is obtained from starting a transmission of the media data, without passing through the server, to a terminal whose media information is not obtained, when the at least three terminals include the terminal whose media information is not obtained and the terminal whose media information is obtained, the media information being obtained by said information obtaining unit; and
a second message transmitting unit configured to determine whether or not media information for a terminal whose media information is not obtained is newly obtained by the information obtaining unit, and to transmit a second message (i) including the media information of the terminal whose media information is newly obtained and (ii) for causing the any terminal whose media information is obtained to start transmitting the media data, without passing through the server, to the terminal whose media information is newly obtained, when the media information of the terminal whose media information is not obtained is newly obtained by said information obtaining unit after the first message is transmitted by said first message transmitting unit.

2. The connection device according to claim 1,
wherein, when the at least three terminals include the terminal whose media information is not obtained by said information obtaining unit and the terminal whose media information is obtained by said information obtaining unit, said first message transmitting unit is configured to transmit, to the any terminal whose media information is obtained, the first message for preventing the any terminal whose media information is obtained from starting the transmission of the media data, without passing through the server, to the terminal whose media information is not obtained, until said information obtaining unit obtains the media information of all of the at least three terminals.

3. The connection device according to claim 2,
wherein said second message transmitting unit is configured to determine whether or not the media information of all of the at least three terminals is obtained by the information obtaining unit, and to transmit, to each of the at least three terminals, the second message including the media information of the other terminals and for causing each of the at least three terminals to start a transmission of the media information to the other terminals without passing through the server, when the media information of all of the at least three terminals is obtained by said information obtaining unit after the first message is transmitted by said first message transmitting unit.

4. The connection device according to claim 1,
wherein the media information includes at least one of an IP address, a port number, and an available codec.

5. The connection device according to claim 4,
wherein the first message includes media information specifying at least one of a temporary IP address and a temporary port number.

6. The connection device according to claim 5,
wherein the temporary IP address is an IP address of said connection device.

7. The connection device according to claim 1,
wherein, when the at least three terminals include the terminal whose media information is not obtained by said information obtaining unit and the terminal whose media information is obtained by said information obtaining unit, said first message transmitting unit is configured to transmit, to the any terminal whose media information is obtained, the first message for preventing the any terminal whose media information is obtained from starting the transmission of the media data, without passing through the server, to the terminal whose media information is not obtained and not preventing the any terminal whose media information is obtained from starting the transmission of the media data, without passing through the server, to another terminal whose media information is obtained.

8. The connection device according to claim 1,
wherein after the first message is transmitted by said first message transmitting unit, said second message transmitting unit is configured to determine whether or not the media information of the terminal whose media information is not obtained is newly obtained by the information obtaining unit and determine whether or not there is a terminal whose media information is not obtained, and to transmit, to the any terminal whose media information is obtained except the terminal whose media information is newly obtained, the second message (i) including the media information of the terminal whose media information is newly obtained, (ii) for causing the any terminal whose media information is obtained except the terminal whose media information is newly obtained to start transmitting the media data, without passing through the server to the terminal whose media information is newly obtained, and for (iii) continuing the prevention of the transmission of the media data, without passing through the server, to the terminal whose media information is not obtained, when the media information of the terminal whose media information is not obtained is newly obtained by said information obtaining unit and there is a terminal whose information is not obtained.

9. The connection device according to claim 1,
wherein the first message is for holding the transmission of the media data, without passing through the server to the terminal whose media information is not obtained.

10. The connection device according to claim 9,
wherein the first message is for causing the terminal whose media information is obtained to prohibit the transmission and the reception, to prohibit the transmission, or to allow the reception only, with respect to the transmission and reception of the media data to and from the other terminals and said connection device, without passing through the server.

11. The connection device according to claim 10,
wherein the first message is compliant with the Session Initiation Protocol (SIP) and includes a=inactive, a=sendonly, or a=recvonly.

12. The connection device according to claim 10,
wherein the first message specifies "0.0.0.0" as an IP address of a destination of the media data.

13. The connection device according to claim 1,
wherein the first message indicates that a terminal which is a callee is being called.

14. The connection device according to claim 13,
wherein the first message is compliant with the Session Initiation Protocol (SIP), and is a response message whose response code is 100 to 199.

15. A connection method for a connection device which establishes a connection among at least three terminals for a multipoint conference in which media data is directly transmitted without passing through a server and obtained among the at least three terminals, said connection method comprising:
obtaining media information related to the transmission and the reception of the media data to and from each of the at least three terminals;
determining whether or not the media information of the each of the at least three terminals is obtained;
transmitting, to any terminal whose media information is obtained, a first message for preventing the any terminal whose media information is obtained from starting a transmission of the media data, without passing through the server, to a terminal whose media information is not obtained, when the at least three terminals include the terminal whose media information is not obtained and the terminal whose media information is obtained, the media information being obtained in said obtaining;
determining whether or not media information for a terminal whose media information is not obtained is newly obtained; and
transmitting, to the any terminal whose media information is obtained, a second message (i) including the media information of the terminal whose media information is newly obtained and (ii) for causing the any terminal whose media information is obtained to start transmitting the media data, without passing through the server, to the terminal whose media information is newly obtained, when the media information of the terminal whose media information is not obtained is newly obtained in said obtaining after the first message is transmitted in said transmitting.

16. A non-transitory computer-readable medium having stored thereon a program for a connection method in a connection device which establishes a connection among at least three terminals for a multipoint conference in which media data is directly transmitted without passing through a server and received among the at least three terminals, the program causing a computer to execute:
obtaining media information related to the transmission and the reception of the media data to and from each of the at least three terminals;
determining whether or not the media information of the each of the at least three terminals is obtained;
transmitting, to any terminal whose media information is obtained, a first message for preventing the any terminal whose media information is obtained from starting a transmission of the media data, without passing through the server, to a terminal whose media information is not obtained, when the at least three terminals include the terminal whose media information is not obtained and the terminal whose media information is obtained, the media information being obtained in said obtaining;
determining whether or not media information for a terminal whose media information is not obtained is newly obtained; and
transmitting, to the any terminal whose media information is obtained, a second message (i) including the media information of the terminal whose media information is newly obtained and (ii) for causing the any terminal whose media information is obtained to start transmitting the media data, without passing through the server, to the terminal whose media information is newly obtained, when the media information of the terminal whose media information is not obtained is newly obtained in said obtaining after the first message is transmitted in said transmitting.

* * * * *